US009658727B2

(12) United States Patent
Lindahl et al.

(10) Patent No.: US 9,658,727 B2
(45) Date of Patent: May 23, 2017

(54) INTERIOR REARVIEW MIRROR SYSTEM

(71) Applicant: Donnelly Corporation, Holland, MI (US)

(72) Inventors: John O. Lindahl, Fruitport, MI (US); Peter J. Whitehead, Grand Rapids, MI (US); Niall R. Lynam, Holland, MI (US); John T. Uken, Jenison, MI (US); Lee Karner, Holland, MI (US); Richard R. Hook, Hudsonville, MI (US)

(73) Assignee: DONNELLY CORPORATION, Holland, MI (US)

( * ) Notice: Subject to any disclaimer, the term of this patent is extended or adjusted under 35 U.S.C. 154(b) by 66 days.

(21) Appl. No.: 14/753,923

(22) Filed: Jun. 29, 2015

(65) Prior Publication Data

US 2015/0331519 A1 Nov. 19, 2015

Related U.S. Application Data

(60) Continuation of application No. 13/422,700, filed on Mar. 16, 2012, now Pat. No. 9,067,542, which is a
(Continued)

(51) Int. Cl.
*G06F 3/044* (2006.01)
*B60R 1/08* (2006.01)
(Continued)

(52) U.S. Cl.
CPC ............... *G06F 3/044* (2013.01); *B60R 1/08* (2013.01); *B60R 1/12* (2013.01); *G02F 1/157* (2013.01);
(Continued)

(58) Field of Classification Search
CPC ...... B60R 1/08; B60R 1/12; B60R 2011/0033; G02F 1/157; G06F 3/044; G06F 3/04817;
(Continued)

(56) References Cited

U.S. PATENT DOCUMENTS 4,436,371 A 3/1984 Wood et al.
D289,989 S 5/1987 Skogler et al.
(Continued)

FOREIGN PATENT DOCUMENTS

GB 2292857 3/1996
GB 2297632 8/1996
(Continued)

*Primary Examiner* — Mohamed Barakat
(74) *Attorney, Agent, or Firm* — Gardner, Linn, Burkhart & Flory, LLP

(57) ABSTRACT

An interior rearview mirror system suitable for use in a vehicle includes an interior rearview mirror assembly having a mirror casing and a transflective reflective element. The transflective reflective element has an electrochromic active region, and a plurality of user input elements is disposed outside of the electrochromic active region and below the electrochromic active region. Each of the individual user input elements is a touch or proximity sensor. A plurality of display elements is disposed behind the transflective reflective element at the electrochromic active region, and each display element is selectively activated by activation of a respective user input element. Each of the individual display elements and its associated respective one of the individual user input elements are located local to one another such that a cognitive relationship between actuation by a user of a respective user input element and activation of its associated display element is established.

20 Claims, 13 Drawing Sheets

Related U.S. Application Data continuation of application No. 12/693,740, filed on Jan. 26, 2010, now Pat. No. 8,138,903, which is a continuation of application No. 11/829,578, filed on Jul. 27, 2007, now Pat. No. 7,683,768, which is a continuation of application No. 11/029,695, filed on Jan. 5, 2005, now Pat. No. 7,253,723, and a continuation-in-part of application No. PCT/US2004/015424, filed on May 18, 2004, said application No. 13/422,700 is a continuation-in-part of application No. 12/118,121, filed on May 9, 2008, now Pat. No. 8,194,133, which is a continuation of application No. 11/284,543, filed on Nov. 22, 2005, now Pat. No. 7,370,983, and a continuation-in-part of application No. 10/538,724, filed as application No. PCT/US03/40611 on Dec. 19, 2003, now abandoned, said application No. 13/422,700 is a continuation-in-part of application No. 12/900,063, filed on Oct. 7, 2010, now Pat. No. 8,277,059, which is a continuation of application No. 12/476,309, filed on Jun. 2, 2009, now Pat. No. 7,826,123, which is a continuation of application No. 12/124,365, filed on May 21, 2008, now Pat. No. 7,542,193, which is a division of application No. 11/837,865, filed on Aug. 13, 2007, now Pat. No. 7,391,563, which is a continuation of application No. 11/021,065, filed on Dec. 23, 2004, now Pat. No. 7,255,451, and a continuation-in-part of application No. PCT/US03/35381, filed on Nov. 5, 2003, said application No. 11/021,065 is a continuation-in-part of application No. PCT/US03/29776, filed on Sep. 19, 2003.

(60) Provisional application No. 60/535,559, filed on Jan. 9, 2004, provisional application No. 60/553,517, filed on Mar. 16, 2004, provisional application No. 60/556,259, filed on Mar. 25, 2004, provisional application No. 60/471,546, filed on May 19, 2003, provisional application No. 60/525,537, filed on Nov. 26, 2003, provisional application No. 60/556,259, filed on Mar. 25, 2004, provisional application No. 60/630,061, filed on Nov. 22, 2004, provisional application No. 60/667,048, filed on Mar. 31, 2005, provisional application No. 60/435,554, filed on Dec. 20, 2002, provisional application No. 60/439,626, filed on Jan. 13, 2003, provisional application No. 60/489,812, filed on Jul. 24, 2003, provisional application No. 60/492,225, filed on Aug. 1, 2003, provisional application No. 60/531,838, filed on Dec. 23, 2003, provisional application No. 60/553,842, filed on Mar. 17, 2004, provisional application No. 60/563,342, filed on Apr. 19, 2004, provisional application No. 60/629,926, filed on Nov. 22, 2004, provisional application No. 60/490,111, filed on Jul. 25, 2003, provisional application No. 60/423,903, filed on Nov. 5, 2002, provisional application No. 60/412,275, filed on Sep. 20, 2002, provisional application No. 60/424,116, filed on Nov. 5, 2002, provisional application No. 60/489,816, filed on Jul. 24, 2003.

(51) Int. Cl.
| | | |
|---|---|---|
| *G02F 1/157* | (2006.01) | |
| *G06F 3/0481* | (2013.01) | |
| *G06F 3/0484* | (2013.01) | |
| *G06F 3/0488* | (2013.01) | |
| *G06F 3/0489* | (2013.01) | |
| *B60R 1/12* | (2006.01) | |
| *B60R 11/00* | (2006.01) | |

(52) U.S. Cl.
CPC .......... *G06F 3/0488* (2013.01); *G06F 3/0489* (2013.01); *G06F 3/04817* (2013.01); *G06F 3/04842* (2013.01); *B60R 2011/0033* (2013.01)

(58) Field of Classification Search
CPC ... G06F 3/04842; G06F 3/0488; G06F 3/0489
See application file for complete search history.

(56) References Cited

U.S. PATENT DOCUMENTS

| | | |
|---|---|---|
| 4,707,570 A | 11/1987 | Ide et al. |
| 4,807,096 A | 2/1989 | Skogler et al. |
| 4,826,289 A | 5/1989 | Vandenbrink et al. |
| 4,862,594 A | 9/1989 | Schierbeek et al. |
| 4,936,533 A | 6/1990 | Adams et al. |
| 4,937,945 A | 7/1990 | Schofield et al. |
| 5,100,095 A | 3/1992 | Haan et al. |
| 5,131,154 A | 7/1992 | Schierbeek et al. |
| 5,153,572 A | 10/1992 | Caldwell et al. |
| 5,181,417 A | 1/1993 | Nishida et al. |
| 5,239,152 A | 8/1993 | Caldwell et al. |
| 5,255,442 A | 10/1993 | Schierbeek et al. |
| 5,550,677 A | 8/1996 | Schofield et al. |
| 5,576,687 A | 11/1996 | Blank et al. |
| 5,594,222 A | 1/1997 | Caldwell |
| 5,632,092 A | 5/1997 | Blank et al. |
| 5,649,756 A | 7/1997 | Adams et al. |
| 5,668,663 A | 9/1997 | Varaprasad et al. |
| 5,673,994 A | 10/1997 | Fant, Jr. et al. |
| 5,708,410 A | 1/1998 | Blank et al. |
| 5,708,804 A | 1/1998 | Goodwin et al. |
| 5,724,187 A | 3/1998 | Varaprasad et al. |
| 5,786,772 A | 7/1998 | Schofield et al. |
| 5,796,094 A | 8/1998 | Schofield et al. |
| 5,798,688 A | 8/1998 | Schofield |
| 5,820,097 A | 10/1998 | Spooner |
| 5,820,245 A | 10/1998 | Desmond et al. |
| 5,877,897 A | 3/1999 | Schofield et al. |
| 5,878,353 A | 3/1999 | Ul Azam et al. |
| 5,924,212 A | 7/1999 | Domanski |
| 5,929,786 A | 7/1999 | Schofield et al. |
| 5,940,503 A | 8/1999 | Palett et al. |
| 5,971,552 A | 10/1999 | O'Farrell et al. |
| 6,000,823 A | 12/1999 | Desmond et al. |
| 6,001,486 A | 12/1999 | Varaprasad et al. |
| 6,005,538 A | 12/1999 | Hoekstra |
| 6,091,376 A | 7/2000 | Takekawa et al. |
| 6,097,023 A | 8/2000 | Schofield et al. |
| 6,102,546 A | 8/2000 | Carter |
| 6,140,933 A | 10/2000 | Bugno et al. |
| 6,243,003 B1 | 6/2001 | DeLine et al. |
| 6,249,369 B1 | 6/2001 | Theiste et al. |
| 6,250,148 B1 | 6/2001 | Lynam |
| 6,262,831 B1 | 7/2001 | Bauer et al. |
| 6,278,377 B1 * | 8/2001 | DeLine ............... B60Q 3/023 340/425.5 |
| 6,310,611 B1 | 10/2001 | Caldwell |
| 6,313,454 B1 | 11/2001 | Bos et al. |
| 6,314,302 B1 | 11/2001 | Haferbeck et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 * | 12/2001 | Skiver ............... B60R 1/12 340/425.5 |
| 6,332,024 B1 | 12/2001 | Inoue et al. |
| 6,341,523 B2 * | 1/2002 | Lynam ............... 73/170.17 |
| 6,353,392 B1 | 3/2002 | Schofield et al. |
| 6,369,804 B1 | 4/2002 | Sandbach |
| 6,420,975 B1 | 7/2002 | DeLine et al. |
| 6,428,172 B1 | 8/2002 | Hutzel et al. |
| 6,437,258 B1 | 8/2002 | Sandbach |

(56) References Cited

U.S. PATENT DOCUMENTS

| | | |
|---|---|---|
| 6,439,755 B1 | 8/2002 | Fant, Jr. et al. |
| 6,441,943 B1 * | 8/2002 | Roberts ............... B60Q 1/2665 250/214 AL |
| 6,452,479 B1 | 9/2002 | Sandbach |
| 6,471,362 B1 | 10/2002 | Carter et al. |
| 6,477,464 B2 | 11/2002 | McCarthy et al. |
| 6,492,980 B2 | 12/2002 | Sandbach |
| 6,497,368 B1 | 12/2002 | Friend et al. |
| 6,501,387 B2 | 12/2002 | Skiver et al. |
| 6,501,465 B2 | 12/2002 | Sandbach |
| 6,504,531 B1 | 1/2003 | Sandbach |
| 6,547,133 B1 | 4/2003 | DeVries et al. |
| 6,560,004 B2 | 5/2003 | Theiste et al. |
| 6,593,565 B2 | 7/2003 | Heslin et al. |
| 6,614,241 B2 | 9/2003 | Schmitt et al. |
| 6,627,918 B2 | 9/2003 | Getz et al. |
| 6,648,477 B2 | 11/2003 | Hutzel et al. |
| 6,678,614 B2 | 1/2004 | McCarthy et al. |
| 6,690,268 B2 | 2/2004 | Schofield et al. |
| 6,698,905 B1 * | 3/2004 | Whitehead ............... B60R 1/04 359/604 |
| 6,714,331 B2 | 3/2004 | Lewis et al. |
| 6,756,912 B2 | 6/2004 | Skiver et al. |
| 6,762,867 B2 | 7/2004 | Lippert et al. |
| 6,795,221 B1 | 9/2004 | Urey |
| 6,824,281 B2 | 11/2004 | Schofield et al. |
| 6,847,487 B2 | 1/2005 | Burgner |
| 6,882,287 B2 | 4/2005 | Schofield |
| 6,946,978 B2 | 9/2005 | Schofield |
| 7,004,593 B2 | 2/2006 | Weller et al. |
| 7,038,577 B2 | 5/2006 | Pawlicki et al. |
| 7,167,796 B2 | 1/2007 | Taylor et al. |
| 7,195,381 B2 | 3/2007 | Lynam et al. |
| 7,224,324 B2 * | 5/2007 | Quist ..................... B60R 1/12 178/18.06 |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,308,341 B2 | 12/2007 | Schofield et al. |
| 7,324,261 B2 | 1/2008 | Tonar et al. |
| 7,338,177 B2 | 3/2008 | Lynam |
| 7,349,143 B2 | 3/2008 | Tonar et al. |
| 7,360,932 B2 | 4/2008 | Uken et al. |
| 7,372,611 B2 | 5/2008 | Tonar et al. |
| 7,379,225 B2 | 5/2008 | Tonar et al. |
| 7,446,924 B2 | 11/2008 | Schofield et al. |
| 7,460,007 B2 * | 12/2008 | Schofield ............ B60C 23/0401 340/438 |
| 7,570,413 B2 | 8/2009 | Tonar et al. |
| 7,602,542 B2 | 10/2009 | Tonar et al. |
| 7,683,768 B2 | 3/2010 | Lindahl et al. |
| 7,864,399 B2 | 1/2011 | McCabe et al. |
| 7,944,371 B2 * | 5/2011 | Foote ................... B60Q 1/2665 340/433 |
| 8,004,741 B2 | 8/2011 | Tonar et al. |
| 8,169,684 B2 | 5/2012 | Bugno et al. |
| 9,067,542 B2 | 6/2015 | Lindahl et al. |
| 2002/0005999 A1 | 1/2002 | Hutzel et al. |
| 2002/0149475 A1 | 10/2002 | Polidl et al. |
| 2007/0019426 A1 * | 1/2007 | Uken ....................... B60R 1/12 362/494 |
| 2010/0321758 A1 | 12/2010 | Bugno et al. |
| 2011/0317242 A1 | 12/2011 | Tonar et al. |
| 2012/0038964 A1 | 2/2012 | De Wind et al. |

FOREIGN PATENT DOCUMENTS

| | | |
|---|---|---|
| WO | WO 2004/103772 | 12/2004 |
| WO | WO 2011/044312 | 4/2011 |
| WO | WO 2012/006422 | 1/2012 |
| WO | WO 2012/051500 | 4/2012 |

* cited by examiner

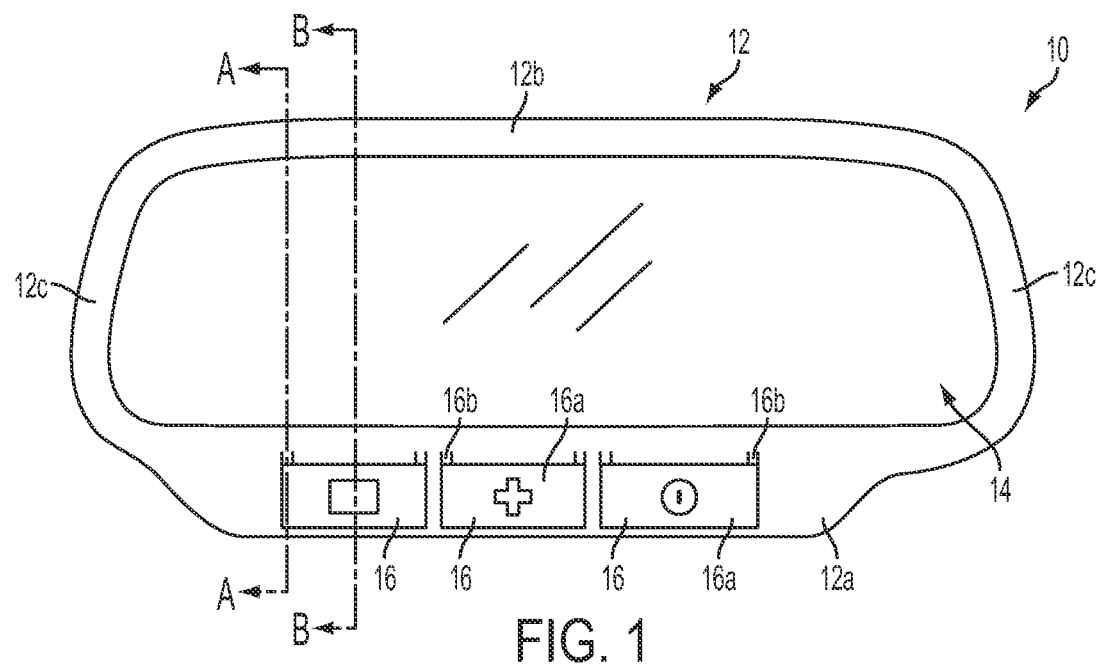
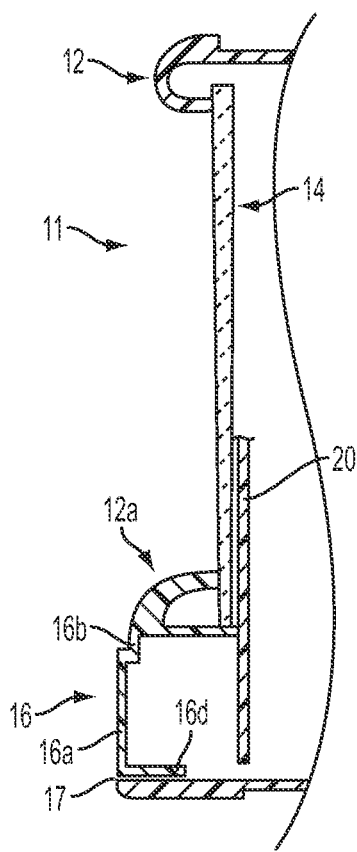 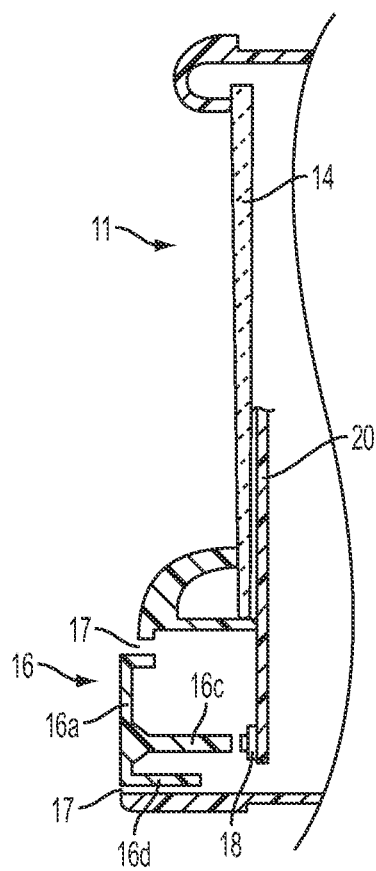
FIG. 1
FIG. 1A  FIG. 1B

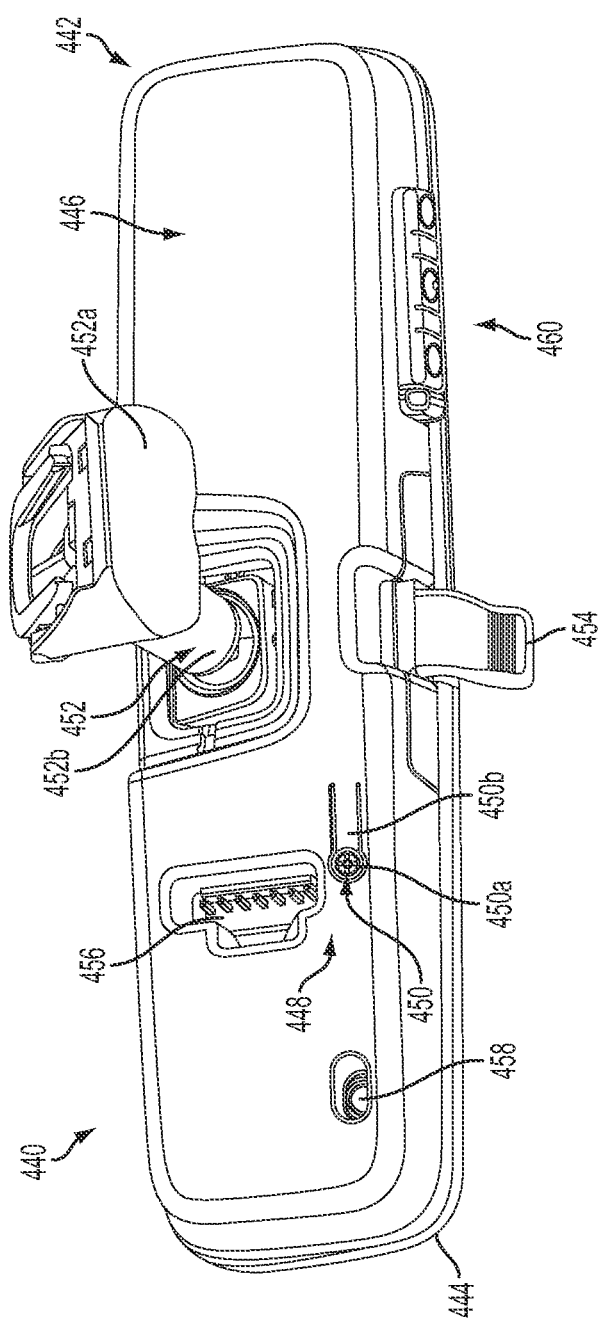

INTERIOR REARVIEW MIRROR SYSTEM

CROSS REFERENCE TO RELATED APPLICATIONS

The present application is a continuation of U.S. patent application Ser. No. 13/422,700, filed Mar. 16, 2012, now U.S. Pat. No. 9,067,542, which is a continuation of U.S. patent application Ser. No. 12/693,740, filed Jan. 26, 2010, now U.S. Pat. No. 8,138,903, which is a continuation of U.S. patent application Ser. No. 11/829,578, filed Jul. 27, 2007, now U.S. Pat. No. 7,683,768, which is a continuation of U.S. patent application Ser. No. 11/029,695, filed Jan. 5, 2005, now U.S. Pat. No. 7,253,723, which claims benefit of U.S. provisional applications, Ser. No. 60/535,559, filed Jan. 9, 2004; Ser. No. 60/553,517, filed Mar. 16, 2004; and Ser. No. 60/556,259, filed Mar. 25, 2004; and U.S. patent application Ser. No. 11/029,695 is a continuation-in-part of PCT Application No. PCT/US2004/015424, filed May 18, 2004, which claims benefit of U.S. provisional applications, Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference in their entireties. U.S. patent application Ser. No. 13/422,700 is also a continuation-in-part of U.S. patent application Ser. No. 12/118,121, filed May 9, 2008, now U.S. Pat. No. 8,194,133, which is a continuation of U.S. patent application Ser. No. 11/284,543, filed Nov. 22, 2005, now U.S. Pat. No. 7,370,983, which claims benefit of U.S. provisional applications, Ser. No. 60/630,061, filed Nov. 22, 2004; and Ser. No. 60/667,048, filed Mar. 31, 2005; and U.S. patent application Ser. No. 11/284,543 is a continuation-in-part of U.S. patent application Ser. No. 10/538,724, filed Jun. 13, 2005, now abandoned, which is a 371 national phase application of PCT Application No. PCT/US03/40611, filed Dec. 19, 2003, which claims benefit of U.S. provisional applications, Ser. No. 60/435,554, filed Dec. 20, 2002; Ser. No. 60/439,626, filed Jan. 13, 2003; Ser. No. 60/489,812, filed Jul. 24, 2003; and Ser. No. 60/492,225, filed Aug. 1, 2003. U.S. patent application Ser. No. 13/422,700 is also a continuation-in-part of U.S. patent application Ser. No. 12/900,063, filed Oct. 7, 2010, now U.S. Pat. No. 8,277,059, which is a continuation of U.S. patent application Ser. No. 12/476,309, filed Jun. 2, 2009, now U.S. Pat. No. 7,826,123, which is a continuation of U.S. patent application Ser. No. 12/124,365, filed May 21, 2008, now U.S. Pat. No. 7,542,193, which is a division of U.S. patent application Ser. No. 11/837,865, filed Aug. 13, 2007, now U.S. Pat. No. 7,391,563, which is a continuation of U.S. patent application Ser. No. 11/021,065, filed Dec. 23, 2004, now U.S. Pat. No. 7,255,451, which claims benefit of U.S. provisional applications, Ser. No. 60/531,838, filed Dec. 23, 2003; Ser. No. 60/553,842, filed Mar. 17, 2004; Ser. No. 60/563,342, filed Apr. 19, 2004; and Ser. No. 60/629,926, filed Nov. 22, 2004; and U.S. patent application Ser. No. 11/021,065 is a continuation-in-part of PCT Application No. PCT/US03/35381, filed Nov. 5, 2003 and published May 21, 2004 as International Publication Number WO 2004/042457, which claims benefit of U.S. provisional applications, Ser. No. 60/490,111, filed Jul. 25, 2003; and Ser. No. 60/423,903, filed Nov. 5, 2002; and U.S. patent application Ser. No. 11/021,065 is a continuation-in-part of PCT Application No. PCT/US03/29776, filed Sep. 19, 2003, and published Apr. 1, 2004 as International Publication Number WO 2004/026633, which claims benefit of U.S. provisional applications, Ser. No. 60/412,275, filed Sep. 20, 2002; Ser. No. 60/424,116, filed Nov. 5, 2002; and Ser. No. 60/489,816, filed Jul. 24, 2003.

FIELD OF THE INVENTION

The present invention relates generally to rearview mirror assemblies for vehicles and, more particularly, to interior rearview mirror assemblies having user actuatable inputs or actuators or buttons for actuating or controlling one or more accessories of the vehicle or mirror assembly or accessory module or the like. Aspects of the present invention are equally suitable for application to a windshield electronics module or accessory module or the like.

BACKGROUND OF THE INVENTION

It is known to provide buttons or inputs along a bezel portion of an interior rearview mirror assembly for a vehicle. The buttons may be depressed by a user to actuate corresponding switches, such as switches mounted on a printed circuit board within the mirror assembly. Typically, the buttons are formed on a flexible keypad that is placed at the bezel portion such that the buttons extend through apertures or openings formed through the bezel portion of the mirror assembly, such as disclosed in U.S. Pat. No. 6,501,387, issued to Skiver et al., which is hereby incorporated herein by reference.

Typically, the mirror manufacturer may purchase or obtain the bezel portion of the mirror assembly from a supplier, or may make it in a bezel fabrication operation, such as a molding operation. The bezel portion may have openings or apertures therethrough, such as in a chin area of the bezel. The mirror manufacturer may also purchase or obtain a printed circuit board from another suppler, or may make such internally. The printed circuit board (PCB) typically includes small switches for actuating or controlling or adjusting an accessory of the mirror assembly or vehicle. The printed circuit board is often positioned to the rear of the reflective element and within the mirror casing. A flexible keypad or buttons may be positioned so as to protrude through the openings in the bezel when the bezel is attached to the casing to assemble the mirror assembly. The bezel may be assembled to the mirror casing, with the reflective element and printed circuit board positioned within the mirror assembly, and with the keypad or buttons positioned at the corresponding switches on the printed circuit board and aligned with and/or at least partially protruding through the corresponding openings in the bezel. The buttons may then be depressed to actuate the switches on the printed circuit board.

SUMMARY OF THE INVENTION

The present invention provides an interior rearview mirror assembly or windshield electronics/accessory module that includes at least one user actuatable control, such as a manual or user input or button or actuator or the like, integrally formed with the bezel of the mirror assembly when the bezel is being formed, such as in a molding operation. Alternately, the user input or actuator may be integrally formed with the casing or housing of the windshield electronics/accessory module when the casing or housing is being formed, such as in a molding operation. The user input or actuator or actuators thus are formed with or integrally formed with the bezel or casing in the same fabrication operation, such as a bezel molding operation, in order to ease the assembly process of the mirror assembly or windshield electronics/accessory module. When assembled into the interior rearview mirror assembly or windshield electronics/accessory module, user actuation of the actuator or actuators preferably in turn causes switch actuation of a switch device of an electrical circuit of the interior rearview mirror assembly or windshield electronics/accessory module. Preferably, such switches are PCB mountable microswitches that are mounted on a printed circuit board (PCB), typically along with other electronic components and circuitry, that may be supplied to the interior mirror assembler, such as by an electronics manufacturer.

According to an aspect of the present invention, an interior rearview mirror assembly for a vehicle includes a casing having a human machine interface thereat. The human machine interface comprises at least one user actuatable input integrally formed at a portion of the casing during the molding operation that forms the casing. The mirror assembly includes circuitry. The user actuatable input is actuatable by a user to operate at least one element of the circuitry.

According to another aspect of the present invention, an interior rearview mirror assembly for a vehicle includes a casing having a bezel portion and a printed circuit board positioned within the casing. The bezel portion includes at least one user input or actuator, such as a button or toggle input/actuator or the like, integrally formed therewith in a molding operation. When the mirror assembly is assembled, the user input preferably is positioned at and configured to actuate a corresponding switch or switches at the printed circuit board.

The user input may comprise a portion of the bezel and may flex to actuate the switch at the printed circuit board. Optionally, the user input may comprise an insert portion that is insert molded within a portion of the bezel while the bezel portion is being formed, such as by a molding operation. The insert portion may be flexible to actuate the switch at the printed circuit board. Optionally, the insert portion may be at least partially transparent or semi-transparent or translucent, and may be back lit by an illumination source or light source at the printed circuit board. The user input or insert portion may include icons or indicia or the like formed or printed thereon to indicate the function of the corresponding switch at the printed circuit board. Alternately or additionally, the user input or insert portion may be molded of a material or decorated with or made of a material that is a different color (or may be printed or colored with a different color) than that of the bezel itself. Optionally, the button or input may have a different textural surface if desired.

According to another aspect of the present invention, a method of manufacturing an interior rearview mirror assembly for a vehicle includes providing a mold cavity for forming a bezel of the mirror assembly and integrally molding at least a portion of a user input or actuator with the bezel portion during the molding process. In one form, the bezel portion is molded around pins or inserts or walls or the like that partially separate a molded user input portion or actuator portion from the bezel portion during the molding process. In another form, a user input portion is insert molded at least partially within the bezel portion during the molding process. The user input portion is thus integrally formed with the bezel portion during the molding process. The bezel (with the integrally molded user input portion) may be assembled to a mirror casing such that the user input portion may be positioned at one or more corresponding switches on a printed circuit board within the mirror casing. When the mirror is assembled, the user input portion may flex (such as in response to a user input, such as pressing the user input portion) relative to the bezel portion to actuate the switch at the printed circuit board.

Preferably, the bezel, with integrated inputs/actuators, is formed via a single shot molding process. However, the bezel, with integrated inputs/actuators, may be formed via a two shot molding process or other molding or forming process, without affecting the scope of the present invention.

Optionally, aspects of the present invention may be equally suited for application to a windshield electronics module or accessory module or the like. For example, one or more user inputs or actuators or buttons or toggles may be integrally formed or molded with a casing or housing or portion thereof of a windshield electronics module or accessory module or pod or the like during the molding of the casing or housing, without affecting the scope of the present invention.

According to another aspect of the present invention, an interior rearview mirror assembly for a vehicle includes a casing, a printed circuit board positioned within the casing, and at least one user input or actuator, such as a toggle or switch or lever or the like. The user input extends generally along a portion of the printed circuit board and extends through an opening in the casing and outward from said casing so that a user may access and actuate or toggle the user input between an actuated position or orientation and a non-actuated position or orientation. When the user input is depressed or actuated by a user, the user input moves to the actuated position and contacts a switch at the printed circuit board. A biasing member or cushioning member is positioned within the casing to engage the user input and generally maintain the user input in the non-actuated position when the user input is released.

The user input may comprise a plastic or polymeric member that may be formed to contact the printed circuit board at one end and to contact the mirror casing at a location remote from the one end, and may be spaced from the switch when in the non-actuated position. When the user input is pressed or moved by a user, the casing limits movement of the user input, and the printed circuit board limits pivoting of the user input at the one end, whereby the user input may flex to contact and engage and actuate the switch. When the user input is released, the biasing or cushioning member limits pivotal movement of the user input away from the printed circuit board.

Optionally, an illumination source, such as a light emitting diode (LED) or the like, may be positioned at the printed circuit board to illuminate at least a portion of the user input that is visible to an occupant of the vehicle. The user input may comprise a light pipe, such that illumination from an illumination source at one end of the user input or lever is transmitted along the user input to illuminate the opposite end of the user input that is viewable by an occupant of the vehicle. The exposed end portion of the user input thus may be illuminated via an illumination source positioned within the mirror casing to illuminate the text or graphics or icons or the like on the user input during low lighting conditions, such as at nighttime.

Therefore, the present invention provides a manual or user input or actuator or button or toggle that is integrally molded or formed with the bezel of an interior rearview mirror assembly or that is insert molded in the bezel during the molding of the bezel. The actuator is integrally formed with the bezel so that a separate keypad or other buttons need not be assembled or positioned at the bezel during the assembly of the mirror assembly. The bezel (with the integrally formed or molded or insert molded toggle or button or actuator or the like) may be attached to a reflective element and/or printed circuit board and/or mirror casing, such that the actuator is positioned at or aligned with a corresponding PCB-mounted switch at the printed circuit board within the mirror assembly. The present invention thus provides enhanced manufacturing and assembly of an interior rearview mirror assembly. The actuator may include an insert portion that is insert molded with the bezel and that may be flexible to facilitate actuation of the PCB switch at the printed circuit board. The input or actuator or insert may be backlit or otherwise illuminated and/or may have icons or indicia or the like printed or formed thereon. The inputs or actuators may be integrally molded or formed with a casing portion of an interior rearview mirror assembly or of a windshield electronics module or of an accessory module or the like during molding of the casing portion, without affecting the scope of the present invention. Optionally, the user input may be positioned partially within the casing and may pivot and/or flex to contact and actuate the switch or switches at the printed circuit board. The user input thus may comprise a low cost plastic or polymeric lever or member that may be readily positioned within the casing during assembly of the rearview mirror assembly.

These and other objects, advantages, purposes and features of the present invention will become apparent upon review of the following specification in conjunction with the drawings.

BRIEF DESCRIPTION OF THE DRAWINGS

FIG. 1 is a front elevation of an interior rearview mirror assembly in accordance with the present invention;

FIG. 1A is a sectional view of the interior rearview mirror assembly taken along the line A-A in FIG. 1;

FIG. 1B is a sectional view of the interior rearview mirror assembly taken along the line B-B in FIG. 1;

FIG. 8 is a rear perspective view of another interior rearview mirror assembly incorporating a human machine interface in accordance with the present invention;

DESCRIPTION OF THE PREFERRED EMBODIMENTS

Figure 2:
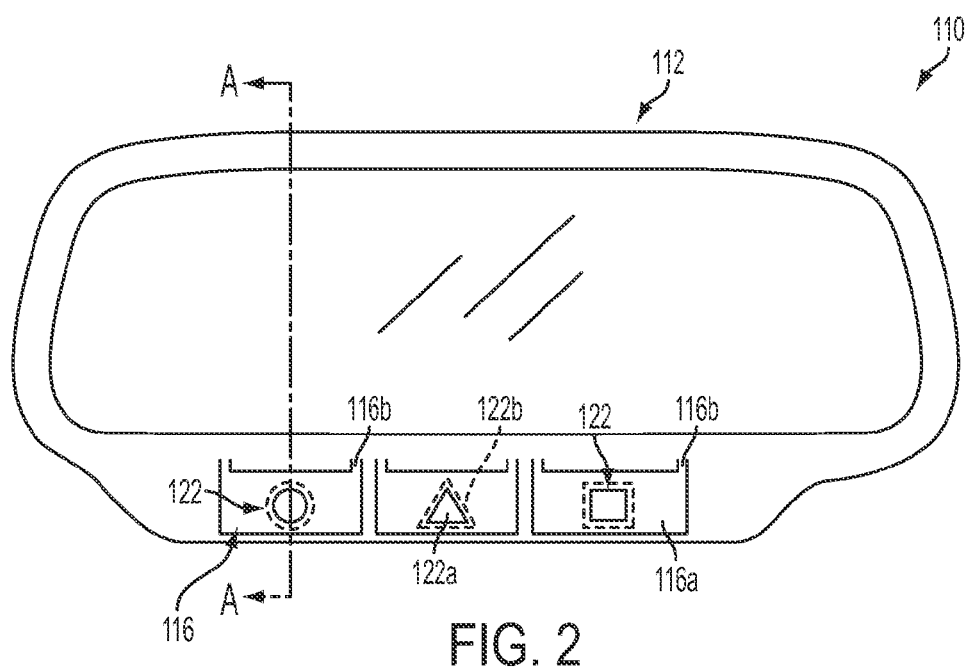
FIG. 2 is a front elevation of another interior rearview mirror assembly in accordance with the present invention.

Referring now to the drawings and the illustrative embodiments depicted therein, an interior rearview mirror assembly 10 includes a casing or housing, which may include a bezel portion 12, and a reflective element 14, and a human machine interface (HMI) that includes at least one user input or user actuatable input or actuator 16, such as a button or toggle or the like at the bezel 12 of the casing or elsewhere at the casing of the mirror assembly (FIGS. 1, 1A and 1B). User actuatable inputs 16 are integrally formed with bezel 12, such as at a chin portion 12a of bezel 12 (or elsewhere around the bezel, such as at an eyebrow portion 12b of the bezel or on the sides 12c of the bezel or the like), during the molding of the bezel. Mirror assembly 10 includes at least one electronic element or switch 18, which may be positioned within the mirror casing. For example, the element or switch 18 may comprise a PCB-mountable microswitch that may be mounted on or at a printed circuit board (PCB) 20 or the like positioned within the mirror casing. PCB elements or switch or switches 18 are positioned generally behind a respective user input 16, such that the user input or button 16 may be actuated or depressed to actuate the respective switch when the bezel 12 is attached to the mirror casing, as discussed below.

The PCB electronic elements or switches 18 are operable or actuatable to activate/deactivate or adjust or control or operate an electrical accessory or component or feature or the like (such as the accessories or systems discussed below) associated with the printed circuit board or with the rearview mirror assembly or with the vehicle. The accessory or component or feature may be incorporated onto the printed circuit board 20 or may be positioned elsewhere in or at the mirror assembly or elsewhere in or at the vehicle, such as in an accessory module or windshield electronics module or the like, such as an accessory module/windshield electronics module of the type described in U.S. Pat. Nos. 6,824,281; 6,690,268; 6,250,148; 6,341,523; 6,593,565; and 6,326,613, and/or U.S. patent application Ser. No. 10/958,087, filed Oct. 4, 2004, now U.S. Pat. No. 7,188,963, and/or U.S. provisional applications, Ser. No. 60/420,560, filed Oct. 23, 2002; Ser. No. 60/398,346, filed Jul. 24, 2002; Ser. No. 60/381,314, filed May 17, 2002; Ser. No. 60/374,724, filed Apr. 23, 2002; Ser. No. 60/364,008, filed Mar. 14, 2002; Ser. No. 60/350,965, filed Jan. 31, 2002; and/or Ser. No. 60/522,123, filed Aug. 18, 2004, which are all hereby incorporated herein by reference. Optionally, the user input or buttons or interfaces may be integrally formed or molded at a casing or housing of an accessory module or windshield electronics module or the like and may be actuatable or depressible to actuate an electronic switch incorporated into the accessory module or windshield electronics module or the like, without affecting the scope of the present invention.

Optionally, the user inputs of the human machine interface may be actuatable to control or operate or activate/deactivate a telematics system of the vehicle, such as an ONSTAR® system of the vehicle or the like (such as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; and/or 6,678,614; and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; Ser. No. 10/422,378, filed Apr. 24, 2003, now U.S. Pat. No. 6,946,978; Ser. No. 10/964,512, filed Oct. 13, 2004, now U.S. Pat. No. 7,308,341; and/or Ser. No. 10/993,302, filed Nov. 19, 2004, now U.S. Pat. No. 7,338,177; and/or PCT Application No. PCT/US03/40611, filed Dec. 19, 2003 and published on Jul. 15, 2004 as PCT Publication No. WO 2004/058540, and/or PCT Application No. PCT/US03/030877, filed Oct. 1, 2003 and published on Apr. 15, 2004 as PCT Publication No. WO 2004/032568, which are all hereby incorporated herein by reference). In prior systems (such as described in U.S. Pat. No. 6,471,362, which is hereby incorporated herein by reference), non-integrally formed user interfaces have been used at a mirror assembly for a vehicle. The user inputs of the human machine interface of the present invention provides an enhanced system and is more readily implemented for use in interior rearview mirror assemblies and/or accessory modules and/or the like, than the user inputs or interfaces of the known systems or assemblies.

As shown in FIGS. 1, 1A and 1B, each user input 16 of the human machine interface may be formed as part of or integral with the chin portion 12a of bezel 12 during the molding of the bezel. For example, user input 16 may comprise a user actuated portion or a body portion or button portion or push pad portion 16a that may be movable (such as via a user's finger pressing against the button portion) relative to bezel 12 via flexing of one or more tabs or connecting elements 16b, in order to actuate the element or switch 18. The button portion 16a may include text or graphics or icons or other indicia printed or formed thereon to indicate to a user what the function of the button is or what accessory or feature the button controls. Optionally, the button portion 16a may have a different exterior surface texture to differentiate the button portion from the chin portion 12a of the bezel 12. As shown in FIG. 1, the flexible tabs or connecting elements 16b may be narrow elements or portions at opposite ends of (or elsewhere around or partially around) the button portion, such that the button portion may be pressed inward by a user and the flexible tabs or elements may flex to allow inward movement of the button portion to activate the element or switch 18. As shown in FIG. 1B, the button portion 16a may have a pin or arm or extension 16c that extends inward toward the element or switch 18, such that as button portion 16a is pressed inward, pin 16c engages and actuates the element or switch 18 at printed circuit board 20. Typically, the button is only depressed or moved a short distance, such as approximately ¼ mm to approximately 1 mm or thereabouts, to actuate the PCB switch with the pin or extension.

Button portion 16a may be integrally formed or molded with bezel 12 during molding of the bezel and, thus, may comprise the same material, such as polypropylene or the like, and may be formed by inserts or pins or walls or portions or the like positioned within the mold cavity to define a gap 17 between button portion 16a and chin portion 12a of bezel 12 after the bezel is molded and cooled and cured. The gap 17 may be defined substantially around button portion 16a except at the tabs or connecting elements 16b, such that the button portion 16a may move relative to bezel 12 as tabs 16b flex or bend. As shown in FIGS. 1A and 1B, button portion 16a may include inward extending portions or lips or edges 16d that extend inward along bezel 12 to provide structural rigidity to the button portion 16a and/or to provide an enhanced appearance to the button portion and the bezel by partially closing the gap or gaps 17 to limit visibility through the gaps. Optionally, the gap or gaps 17 may be small enough or minimal to limit visibility therethrough to enhance the appearance of the mirror assembly. Optionally, the button portion 16a may be formed to be thick enough to be substantially rigid or non-flexible.

User input or inputs 16 thus may be integrally formed with the bezel of the mirror assembly, such that an additional keypad or set of buttons or the like need not be aligned with and/or inserted into the appropriate openings in the bezel and held in place during the assembly process. Optionally, the integrally formed bezel and user inputs (and the reflective element and printed circuit board) may comprise a bezel assembly 11 (FIGS. 1A and 1B) that may be secured to or attached to the mirror casing to form the mirror assembly. Optionally, the bezel portion may comprise a unitary or one-piece bezel portion (preferably molded from a thermoplastic resin, such as polypropylene or the like), which receives the reflective element therein. Optionally, the reflective element (and optionally a toggle assembly for a prismatic mirror assembly) may be secured into place in the bezel while the molded bezel (preferably the freshly molded bezel portion) is still warm and pliable, such as disclosed in U.S. Pat. No. 4,436,371, issued to Wood et al., which is hereby incorporated herein by reference. When the molded bezel portion (preferably the freshly molded bezel portion and thus just exiting the injection molding press, or alternately, and less desirably, a heated bezel portion having been heated, such as in an oven or the like, to make the bezel portion warm and pliable) cools and shrinks, the bezel portion grips around the reflective element (and toggle assembly) to retain the reflective element (and toggle assembly) in the mirror assembly. The assembled bezel assembly then may be snapped into or otherwise attached to the casing to complete the mirror assembly. Optionally, however, the bezel and user inputs may be integrally formed during a molding process, and the bezel may be attached to the casing (which may include or house or contain the reflective element and printed circuit board) to assemble the mirror assembly. Optionally, the user inputs may be integrally formed elsewhere on the mirror assembly, such as on or in the casing of the mirror assembly. The user inputs thus may be integrally formed in a bezel portion or in a casing portion or housing portion of the mirror assembly, without affecting the scope of the present invention. Optionally, the mirror assembly may comprise other types of casings or bezel portions or the like, such as described in U.S. Pat. Nos. 6,439,755; 4,826,289; 6,756,912; and 6,501,387; and/or U.S. patent application Ser. No. 10/933,842, filed Sep. 3, 2004, now U.S. Pat. No. 7,249,860; Ser. No. 10/993,302, filed Nov. 19, 2004, now U.S. Pat. No. 7,338,177; and/or Ser. No. 11/021,065, filed Dec. 23, 2004, now U.S. Pat. No. 7,255,451, and/or PCT Application No. PCT/US2004/015424, filed May 18, 2004 and published on Dec. 2, 2004 as PCT Publication No. WO 2004/103772, and/or U.S. provisional applications, Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference.

The casing of the mirror assembly thus may include a bezel portion that attaches to or snaps to the rear casing portion, with the human machine interface at the bezel portion of the casing or elsewhere at the casing. The reflective element may be disposed within the casing, such as at the bezel portion of the casing. For example, for a prismatic mirror assembly, the bezel portion and the rest of the casing can be molded around the reflective element, or a separate bezel portion can be made and the reflective element attached thereto, and a cap portion or rear casing portion may be attached to the bezel portion, the combination forming the casing, such as by utilizing aspects disclosed in PCT Application No. PCT/US2004/015424, filed May 18, 2004 and published on Dec. 2, 2004 as PCT Publication No. WO 2004/103772, which is hereby incorporated herein by reference.

The bezel or casing, including the user input or inputs, thus may be formed of the same polymeric and/or resinous material, and may be formed during the same molding process that forms the bezel portion and/or casing. The narrowed tabs 16b of the inputs may connect the inputs to the bezel or casing, and may flex or function as a living hinge to allow movement of the button portion 16a relative to the bezel or casing so that the user input may move to actuate or operate the element or switch within the mirror assembly. Optionally, the user actuatable inputs may comprise plastic or polymeric or resinous inputs that are moved to actuate or operate the element or switch of the circuitry, or the user actuatable input may house or contain a touch sensor or proximity sensor element (such as the types described below) within a portion of the user actuatable input (such as a proximity sensor insert molded within the button portion or body portion of the user actuatable input), without affecting the scope of the present invention.

Thus, for example, the human machine interface or user interface may be integrally molded during the formation of the mirror casing and/or bezel portion of the casing (for applications where the casing consists of, for example, a bezel portion that snaps or attaches to a rear casing or housing portion to form the mirror casing). For example, the likes of a proximity sensor and/or other sensor or user input or accessory or entity may be placed into an injection mold and molten plastic polymeric resinous material may be injected (or otherwise disposed or introduced) into the mold to integrally mold or form or join or integrate the bezel portion or casing portion and the entity (such as described above) inserted or placed in the mold tool during the same molding process. After the resinous material has cooled/cured and the part is removed from the mold, the user actuatable input is integral with the casing or bezel portion.

Figure 2A:
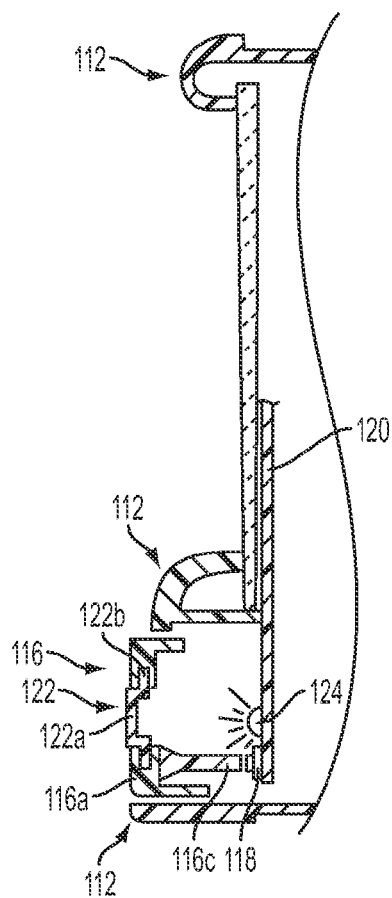
FIG. 2A is a sectional view of the interior rearview mirror assembly taken along the line A-A in FIG. 2, showing an actuator or input of the present invention.
Figure 2B:
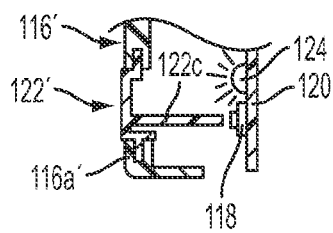
FIG. 2B is another sectional view similar to FIG. 2A of another actuator or input of the present invention.

The interior rearview mirror assembly may be adjustably mounted to an interior surface or portion of the vehicle, such as to an interior surface of the vehicle windshield or to a header portion of the vehicle or the like, and such as via any mounting arm and button or any other mounting arrangement, such as via the mounting assemblies or mounting arrangements of the types described in U.S. Pat. Nos. 6,318,870; 5,671,996; 5,813,745; 5,673,994; 5,820,097; 5,708,410; 5,576,687; 5,521,760; 5,330,149; 5,100,095; 5,058,851; 4,930,742; 4,936,533; 4,436,371; 4,524,941; 4,435,042; and/or 4,646,210, and/or U.S. provisional applications, Ser. No. 60/609,642, filed Sep. 14, 2004; Ser. No. 60/624,091, filed Nov. 1, 2004; and Ser. No. 60/638,250, filed Dec. 21, 2004, which are all hereby incorporated by reference herein. Referring now to FIGS. 2, 2A and 2B, a human machine interface includes at least one user actuatable input or actuator or button 116 of an interior rearview mirror assembly 110. The user input or inputs may be integrally formed or molded with a bezel 112 during the molding of the bezel, and may include a button portion 116*a* and one or more flexible tabs or connecting elements 116*b*, similar to the user input 16 of mirror assembly 10, discussed above. User input 116 may include an actuator insert 122 that may be insert molded at and partially in button portion 116*a*, as best shown in FIG. 2A. User input 116 is otherwise similar to user input 16, described above, and includes a pin or arm or extension 116*c* for actuating an element or switch 118 on a printed circuit board 120. Optionally, and with reference to FIG. 2B, the actuator insert 122' may include the pin or arm or extension 122*c* for actuating the element or switch 118 when the button portion 116*a'* is depressed.

Actuator insert 122 may be any desired shape and may include a panel portion or viewable portion 122*a* and a tab or insert portion 122*b* that is insert molded within button portion 116*a* to retain insert 122 on button portion 116*a*, as best shown in FIG. 2A. The insert portions 122*b* may extend outwardly from the panel portion 122*a* and may be positioned within a portion of the mold cavity during molding of the bezel, such that the bezel is molded around the insert portions to adhere to or bond to the insert portions, and/or the insert portions are otherwise retained in the inputs and bezel portion, such as by mechanical interlocking of the bezel material and the connecting elements 122*b* during molding and curing of the bezel, in order to secure or retain the inserts in the buttons or inputs 116 and bezel 112. The inserts may be positioned at the desired/appropriate location in the mold cavity and the plastic or polypropylene material may be shot into the mold to mold the bezel and to mold the button portion or portions around the insert or inserts. Preferably, the bezel (with the integrally formed actuator and insert) is molded via a one-shot or single shot molding process. However, the bezel may be molded via a two-shot or double-shot molding process or other molding processes, without affecting the scope of the present invention.

Optionally, panel portion 122*a* of actuator insert 122 may have text or characters or graphics or icons or other indicia printed or formed thereon to indicate the function of the button or user input, if desired. Optionally, actuator insert 122 may comprise a thin panel portion or a partially transparent or translucent panel portion or material, and printed circuit board 120 may include an illumination source 124 to back light or provide illumination to and through panel portion 122a to enhance visibility of the user input 116. Optionally, the illumination source 124 may be activated to emit such illumination when the button is depressed to indicate to the user that the PCB element or switch 118 on the printed circuit board was successfully activated. Illumination source 124 may comprise a vacuum fluorescent (VF) element, a liquid crystal display (LCD) element, a light emitting diode (LED), such as an inorganic LED or an organic light emitting diode (OLED), such as disclosed in U.S. Pat. Nos. 6,690,268 and 6,428,172 and in U.S. patent application Ser. No. 10/054,633, filed Jan. 22, 2002, now U.S. Pat. No. 7,195,381, which are hereby incorporated herein by reference, an electroluminescent (EL) element or the like, without affecting the scope of the present invention.

Figure 3:
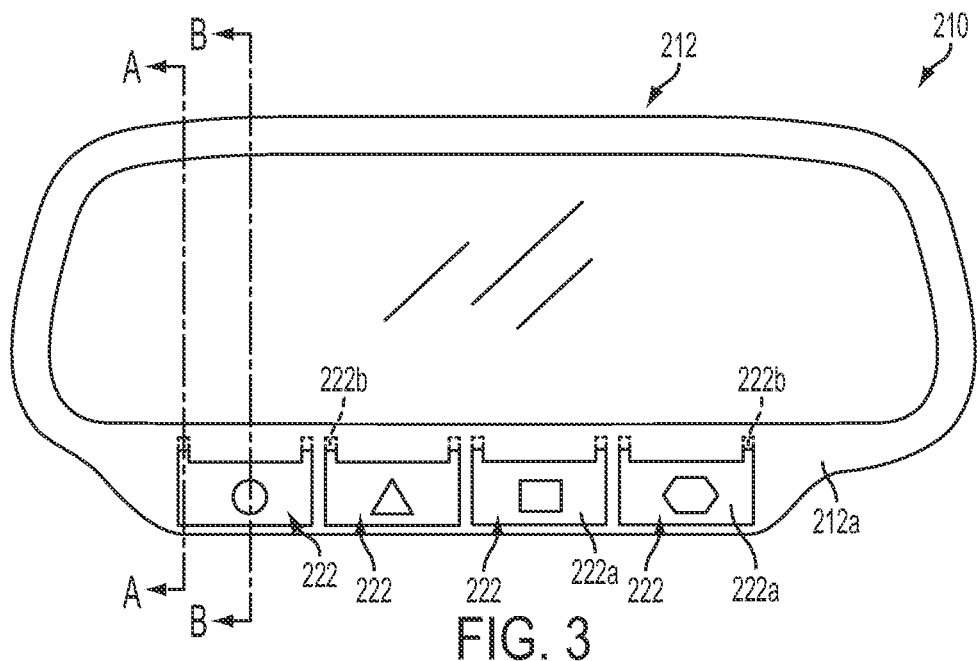
FIG. 3 is a front elevation of another interior rearview mirror assembly in accordance with the present invention.
Figure 3A:
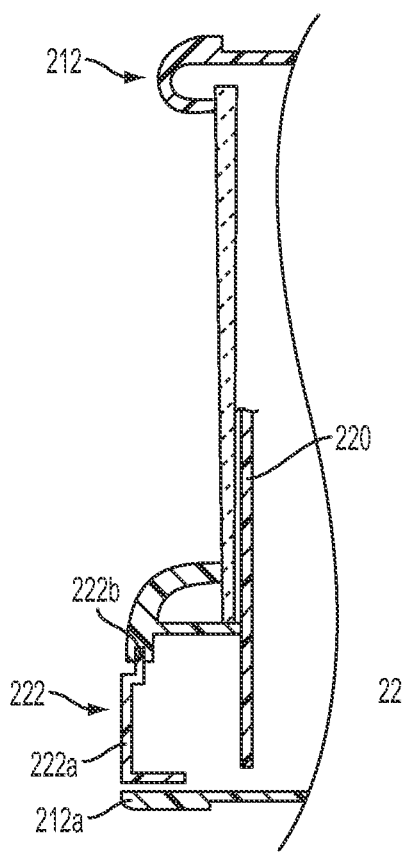
FIG. 3A is a sectional view of the interior rearview mirror assembly taken along the line A-A in FIG. 3.
Figure 3B:
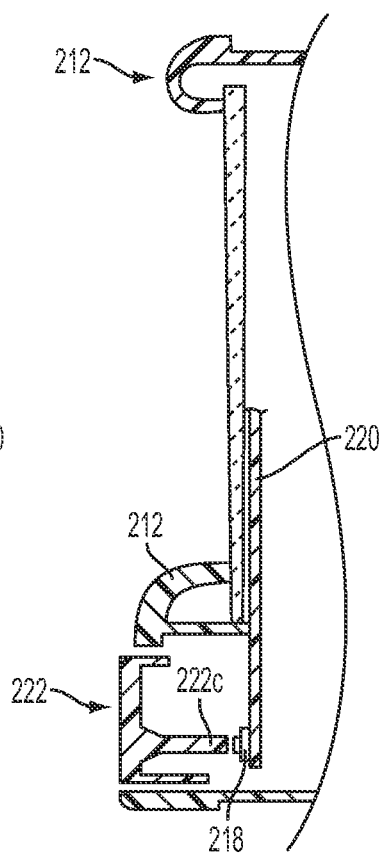
FIG. 3B is a sectional view of the interior rearview mirror assembly taken along the line B-B in FIG. 3.

Optionally, and with reference to FIGS. 3, 3A and 3B, a human machine interface includes at least one user input or button 216 of an interior rearview mirror assembly 210. The user input or inputs may comprise an actuator insert 222 that is insert molded partially within a chin portion 212a of a bezel 212 during the molding of the bezel. Actuator insert 222 may include a button portion 222a and one or more flexible tabs or connecting elements 222b, similar to button 16 of mirror assembly 10, discussed above. The tabs or connecting elements 222b may be molded into the bezel 212 to retain insert 222 to the bezel 212, and may be flexible to allow for movement of button portion or push pad portion 222a relative to bezel 212. The pads or tabs or connecting elements 222b may comprise a thin strip of material for the bezel material to adhere or bond to, and/or the insert portions may be otherwise retained in the bezel portion, such as by mechanical interlocking of the bezel material and the connecting elements 222b during molding and curing of the bezel, in order to secure or retain the inserts at and in the molded bezel. As shown in FIG. 3B, actuator insert 222 includes a pin or extension 222c for actuating an element or switch 218 on a printed circuit board 220. Actuator insert 222 may otherwise be substantially similar to user input 116 and actuator insert 122, discussed above, such that a detailed discussion of the insert and button will not be repeated herein.

Figure 3C:
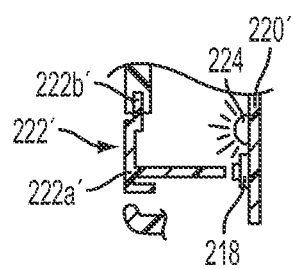
FIG. 3C is a sectional view similar to FIG. 3B of another actuator or input of the present invention.

Optionally, and as can be seen in FIG. 3C, the tab or connecting element 222b' of an actuator insert 222' may extend at least partially along the upper portion of the insert 222'. Optionally, the insert 222' may comprise a thin panel portion or a partially transparent or translucent panel portion or material, and the printed circuit board 220' may include an illumination source 224 to back light or provide illumination to and through button or panel portion 222a' to enhance visibility of the user input or button or insert 222' or to provide visual confirmation of actuation of the PCB element or switch, as discussed above.

Figure 4:
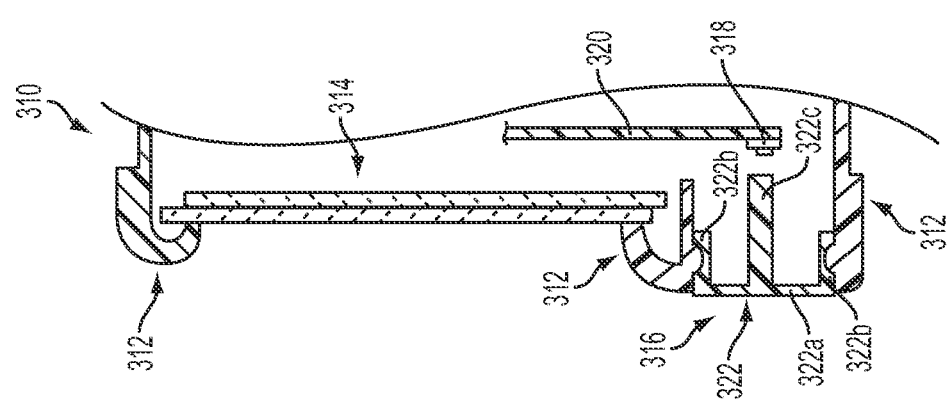
FIG. 4 is a sectional view of another interior rearview mirror assembly taken generally along a centerline of a user input or actuator of the present invention.

Optionally, and with reference to FIG. 4, a human machine interface may include at least one manual input or user actuatable input or actuator 316 that includes an actuator insert 322 that is insert molded in the chin portion 312a of the bezel 312 of an interior rearview mirror assembly 310, which also includes a reflective element 314. The insert 322 may include a panel portion or button portion or push pad 322a and tabs or connecting elements 322b that are molded in or adhered or bonded to or mechanically secured to the bezel 312. Push pad 322a may comprise a thin, flexible portion of insert 322 and may include a pin or arm or extension 322c extending into the bezel and toward a PCB element or switch 318 on a printed circuit board 320, such that pressing against the push pad 322a causes pin 322c to engage and actuate the element or switch 318 to perform the desired function. The insert 322 may comprise a flexible material that may be insert molded within the bezel during molding of the bezel and retained therein, such as in the manner described above. The insert 322 may have a thickness that allows for flexing of the push pad portion 322a, and may be thick enough to provide a "bump-in/bump-out" click or feel to the push pad when it is depressed and released by a user. Optionally, the insert 322 may comprise a translucent material and the printed circuit board may include an illumination source, such as described above, to back light the icon or logo or indicia or the like on the push pad portion of the insert or user input, without affecting the scope of the present invention. The illumination source may be activated to back light the insert when other interior lights are activated, so as to provide illumination of the insert during darkened or nighttime conditions, or the illumination source may be activated to back light the insert when the input or actuator is depressed by a user to confirm successful actuation of the element or switch, or the illumination source may be activated during other situations, without affecting the scope of the present invention. The user input or actuator thus may preferably provide an audible or tactile or visible or haptic acknowledgement of successful element/switch actuation to the driver or occupant using the user input or actuator. The mirror assembly and user input may otherwise be substantially similar to the mirror assemblies and user inputs described above, such that a detailed discussion of the mirror assembly and user input will not be repeated herein.

Figure 6:
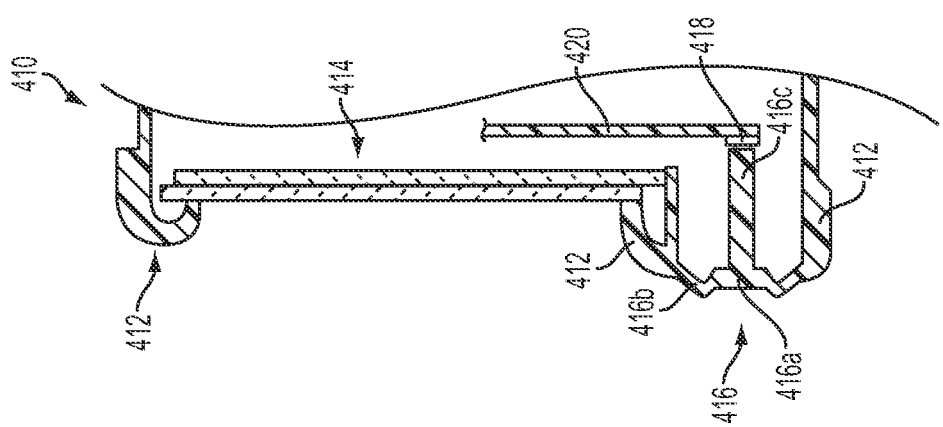
FIG. 6 is a sectional view similar to FIG. 5, with a push pad portion of the user input or actuator depressed to actuate the PCB switch in accordance with the present invention.
Figure 5:
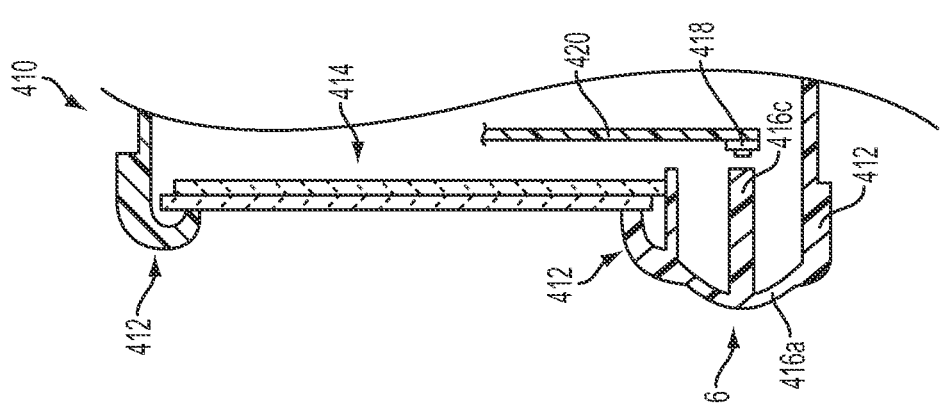
FIG. 5 is a sectional view similar to FIG. 4 of another rearview mirror assembly in accordance with the present invention.

Optionally, and with reference to FIG. 5, a human machine interface may include at least one user input or user actuatable input 416, which may be integrally formed or molded in the chin portion 412a of the bezel 412 during molding of the bezel 412 of an interior rearview mirror assembly 410, which also includes a reflective element 414. The user input 416 may include a panel portion or button portion or push pad 416a, and may comprise a diaphragm button or bubble button or actuator. Push pad 416a may comprise a thin, flexible portion of user input 416 and may have a pin or arm or extension 416c extending into the bezel and toward a PCB element or switch 418 on a printed circuit board 420, such that pressing against the push pad 416a causes pin 416c to engage and actuate the element or switch 418 to perform the desired function. The button portion or push pad 416a thus may be substantially thin and flexible to allow for inward and outward flexing of the button portion when it is pressed and released by a user. The thin button portion 416a, or at least the outer regions 416b of the button portion 416a, thus may function as a living hinge to facilitate inward and outward movement of the button portion 416a and/or the pin 416c as the button portion 416a is pressed and released by a user, as can be seen in FIG. 6. As shown in FIG. 5, the button portion may be bubble or convex-shaped to provide a raised button portion along the bezel that a user will readily recognize as a button or actuator. Optionally, the button portion or living hinge portion may be thick enough to provide a "bump-in/bump-out" click or feel to the push pad or button portion when it is depressed and released by a user. Optionally, the button portion may be substantially thin and/or may comprise a translucent material and the printed circuit board may include an illumination source, such as described above, to back light the icon or logo or indicia or the like on the push pad portion of the user input, without affecting the scope of the present invention. The mirror assembly and user input may otherwise be substantially similar to the mirror assemblies and user inputs described above, such that a detailed discussion of the mirror assembly and user input will not be repeated herein.

Figure 7:
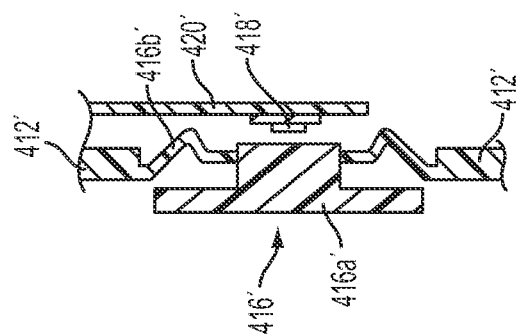
FIG. 7 is a sectional view of another actuator or input integrally formed with a bezel in accordance with the present invention.

Optionally, and as shown in FIG. 7, a push pad 416a' of a user input 416' of a human machine interface at an interior rearview mirror assembly may provide an enlarged and/or raised pad area for a user to press, while the living hinge portion 416b' may be positioned behind the pad area and integrally molded with the push pad portion 416a' and the bezel 412' during the molding process. In the illustrated embodiment of FIG. 7, the push pad 416a' is positioned close to the PCB element or switch 418' on the printed circuit board 420', such that no pin or extension is required to reach and engage the PCB element or switch to actuate the switch as the push pad is depressed by a user.

Optionally, a human machine interface and user actuatable input may be integrally formed or molded at other portions of the mirror casing, without affecting the scope of the present invention. For example, a human machine interface may be integrally molded at a rear or back portion of a mirror casing or at a cap portion of a mirror assembly, without affecting the scope of the present invention. For example, and such as shown in FIG. 8, an interior rear view mirror assembly 440 includes a mirror casing 442 that includes a front bezel portion 444 and a rear cap portion 446, such as described in PCT Application No. PCT/US2004/015424, filed May 18, 2004 and published on Dec. 2, 2004 as PCT Publication No. WO 2004/103772, which is hereby incorporated herein by reference. The cap portion 446 includes a human machine interface 448 having a user actuatable input or button or control 450. The user actuatable input may be pressed by a user to contact or actuate a button or switch or control or element of circuitry of the mirror assembly, such as an element or switch of compass circuitry on a circuit board within the mirror assembly.

The circuitry on the circuit board thus may include a button or switch or control or element that is actuatable by the user actuatable input or button or control 450, such as at the rear of the cap portion 446 or at the rear of the mirror holder, such as, for example, for actuating a calibration or zone function of compass circuitry within the mirror assembly. The user actuatable input 450 may include an inward protrusion that extends forwardly from a body portion or button portion or actuated portion 450a of the user actuatable input 450 and forwardly from the cap portion 446 or inwardly toward the element or switch or control on the circuit board when the cap portion 446 is positioned at the circuit board. The body or button or actuated portion 450a is integrally formed at an end of a flexible tab 450b, which is integrally formed with and extending partially along the cap portion 446. When a user presses at the body portion 450a of user actuatable input 450, the tab 450b flexes and the body portion 450a (and a contacting portion or protrusion on the inward side of the body portion) is moved toward and urged against the element or switch on the circuit board to actuate the element or switch to control or activate/deactivate the associated function of the compass circuitry (or other circuitry or accessory or the like that may be associated with the element or switch on the circuit board). Although shown and described as being integrally formed with a single cap or casing portion 446, the button/flexible tab or flip actuation tab member may be integrally formed on one of opposite side cap portions or end portions or the like (such as described in PCT Application No. PCT/US2004/015424, filed May 18, 2004 and published on Dec. 2, 2004 as PCT Publication No. WO 2004/103772, which is hereby incorporated herein by reference), or on other types of casings or housings or the like, without affecting the scope of the present invention.

In the illustrated embodiment, mirror assembly 440 includes a mounting assembly 452 for adjustably mounting the mirror casing or mirror head to an interior surface or portion of the vehicle, such as via a mounting base 452a that attaches to a mirror mounting button or the like at an interior surface of the vehicle windshield. The mirror assembly comprises a prismatic mirror assembly and has a toggle member or flip tab 454 for adjusting the prismatic mirror reflective element relative to the mounting arm 452b, such as is known in the mirror arts. The circuit board or circuitry of the mirror assembly 440 may be electrically connected to a wiring harness or the like via an electrical connector 456 that is accessible at the rear of the mirror assembly for connection to the wiring harness. Optionally, the circuit board may also have an ambient light sensor or photocell 458 for detecting the ambient light level at the mirror assembly, whereby the circuitry may adjust the intensity of a display in response to the detected ambient light levels. The ambient light sensor 458 is positioned at a corresponding opening in the cap portion 446 to allow the ambient light sensor to detect the ambient light levels through the opening. The mirror assembly may include other accessories or elements or circuitry or other user actuatable inputs, such as the types described above or other inputs 460 or the like, such as for activating/deactivating/controlling an electronic accessory or feature or element or the like of or associated with the mirror assembly.

The cap portion may be positioned at an opening of the mirror holder, such that the accessories or circuitry supported by the cap portion are positioned generally within the mirror holder. Optionally, the unitary cap portion may snap onto or otherwise secure to the mirror holder and generally cover or define the rear portion of the mirror assembly when so assembled. The cap portion thus supports the circuit board or circuit boards and associated circuitry and/or accessories at or within the mirror assembly, such as described in PCT Application No. PCT/US2004/015424, filed May 18, 2004 and published on Dec. 2, 2004 as PCT Publication No. WO 2004/103772, which is hereby incorporated herein by reference.

Optionally, the circuit boards or accessories may be provided at, within or on the cap portion at a cap portion manufacturing facility or electrical accessory manufacturing facility, such that the cap portion and circuitry assemblies are provided as a unit to the mirror assembly facility or plant. The cap portion and circuitry units may then be snapped or otherwise affixed to the mirror holder or reflective element assembly portion of an appropriate mirror assembly having features or components or displays corresponding to the cap portion and circuitry units, as discussed below. The assembly or back-loading of the cap portions to the mirror holder and reflective element assembly portion thus may be performed remote from the molding tool for molding the mirror holder, since the cap portions may be mounted to the mirror holder after the mirror holder has cooled and shrunk.

Each cap portion may support one or more desired accessories or circuit boards for providing the desired feature to the mirror assembly. The cap portion or portions, and corresponding accessory or feature or electrical content, may be selected and attached to a universal or common mirror holder to provide different features to the mirror holder depending on the options selected for a particular application or vehicle. Optionally, the cap portions may be selected/configured to have accessories contained/supported therein to correspond to and be aligned with/juxtapositioned with one or more displays of a particular or respective reflective element secured in the common mirror holder and/or may correspond with a particular mirror holder for applications where the accessory includes buttons or controls which may extend through openings or recesses in the mirror holder for access thereto by the driver or occupant of the vehicle, such as described in PCT Application No. PCT/US2004/015424, filed May 18, 2004 and published on Dec. 2, 2004 as PCT Publication No. WO 2004/103772, which is hereby incorporated herein by reference.

Although shown and described as push button type inputs or actuators, it is envisioned that other types of human machine interfaces and/or actuators may be integrally formed with or integrally molded with or insert molded with the bezel (or casing or the like) of a mirror assembly or accessory module/windshield electronics module or the like during the molding of the bezel or casing, without affecting the scope of the present invention. For example, the integrally formed or molded or insert molded actuator may comprise a toggle type actuator that may be pressed at either side to pivot or toggle or rock the actuator to engage and actuate a corresponding PCB element or switch positioned behind either side of the toggle actuator. The toggle or rocker switch may be integrally molded with the bezel during molding of the bezel, and may include tabs or connecting elements generally at a central region of the toggle, such that the tabs may flex to allow the toggle to be pressed or rocked toward either side to actuate the desired respective PCB element or switch. Other types of actuators may be implemented, without affecting the scope of the present invention.

Optionally, other elements besides human machine interface elements may be integrally molded at or within a portion of the casing of the mirror assembly. For example, other electronic accessories or modules or elements, such as, for example, a microphone module or element, an antenna module or element, a lighting module or element, a lens module or element, an optical module or element, and/or the like, may be integrally molded at a portion of the mirror casing as described above.

The material selected for the bezel and/or the inputs or actuators or buttons may comprise a flexible material to facilitate movement of the actuator relative to the rest of the bezel. Optionally, the material of the button or actuator may be colored or shaped as desired, and may provide a raised push pad region, and may have printing or text or icons or logos or other indicia formed or printed thereon, without affecting the scope of the present invention. Optionally, the exterior surface or face of the button or actuator may have a different texture than the bezel or casing to differentiate the button or actuator from the bezel. Optionally, the button or actuator material may comprise a soft touch material or a soft touch surface or portion, such as disclosed in U.S. Pat. No. 6,318,870, which is hereby incorporated herein by reference.

Therefore, the manual inputs or user actuatable inputs or buttons or the like of the present invention may be integrally formed or molded with the bezel and/or the rest of the casing of the mirror assembly during molding of the bezel and/or the rest of the casing, or may be insert molded within the bezel and/or the rest of the casing of the mirror assembly during molding of the bezel and/or the rest of the casing, such that the user inputs or buttons are incorporated into the bezel and/or the rest of the casing and do not have to be supplied as a separate component of the bezel and/or the rest of the casing and/or mirror assembly. The integral inputs or actuators or buttons or toggles or the like of the present invention thus reduce the manufacturing processes or steps in manufacturing and assembling the mirror assembly. The inputs or actuators of the present invention may provide a desired human-machine interface (HMI) feel and touch, and may provide an enhanced aesthetic appearance to the mirror assembly. Optionally, the integral inputs or actuators or buttons or toggles or the like may be integrally formed or molded or insert molded in a casing or housing portion of the mirror assembly or in a casing or housing portion of an accessory module or windshield electronics module or pod or attachment during molding of the casing or housing portion, without affecting the scope of the present invention.

Figure 9:
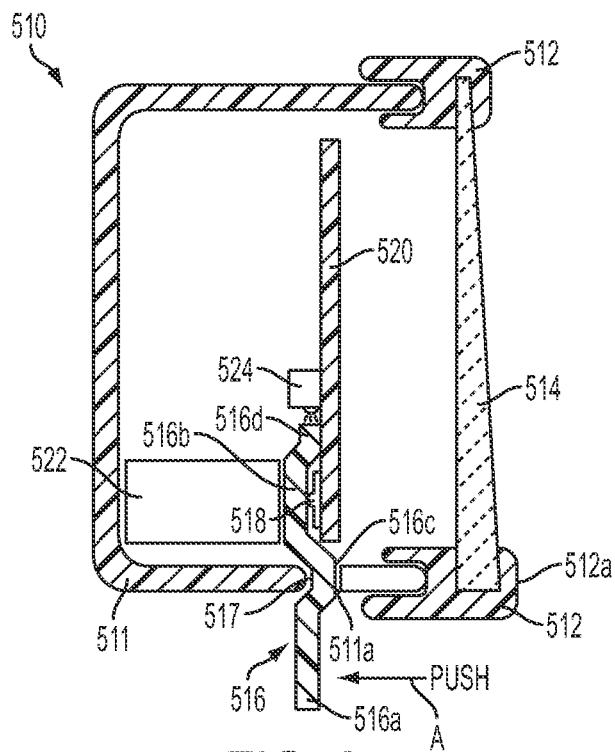
FIG. 9 is a sectional view of another interior rearview mirror assembly taken generally along a centerline of a user input or actuator of the present invention.
Figure 10:
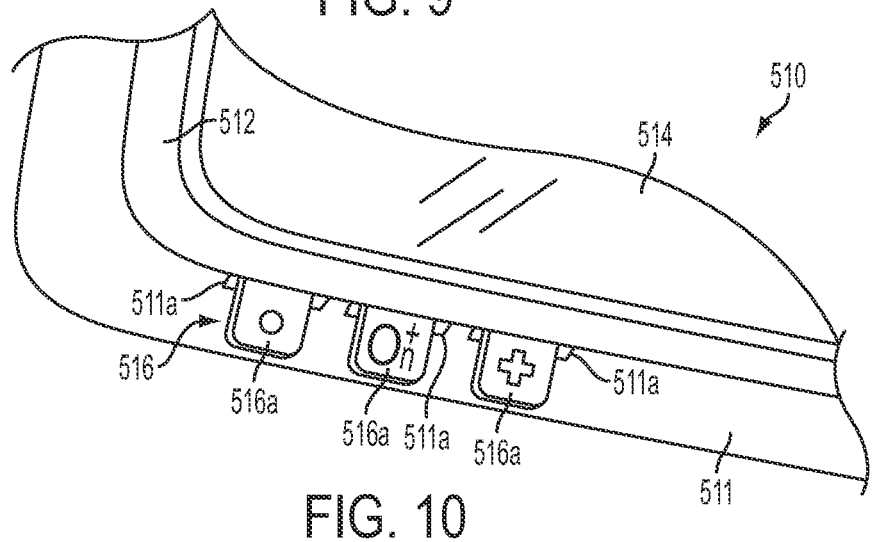
FIG. 10 is a perspective view of a lower portion of the mirror assembly of FIG. 9, showing the user inputs or actuators at the lower portion.
Figure 11:
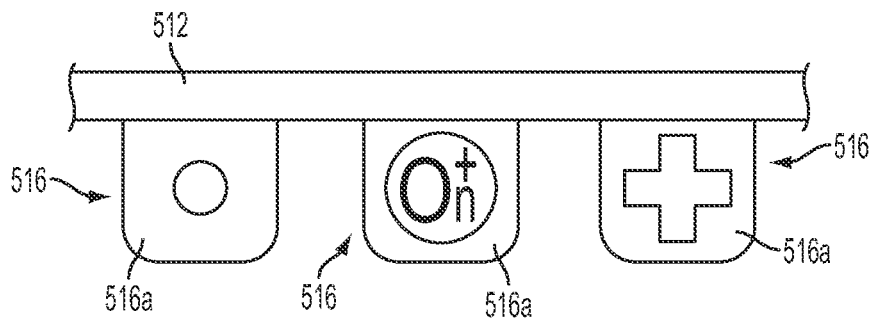
FIG. 11 is a front elevation of the user inputs of FIGS. 9 and 10, viewing forwardly in a direction of travel of the vehicle.

Optionally, and with reference to FIGS. 9-11, an interior rearview mirror assembly 510 includes a casing 511, a bezel 512 and a reflective element 514, and a human machine interface having at least one manual input or user actuatable input or actuator 516, such as a button or toggle or the like at bezel 512. User actuatable inputs 516 are movably positioned at casing 511 and/or bezel 512, such as at or adjacent to a chin portion 512*a* of bezel 512 (or elsewhere around the bezel). Mirror assembly 510 includes at least one electronic element or switch 518, which may be positioned within the mirror casing. For example, the element or switch 518 may comprise a PCB-mountable microswitch that may be mounted on or at a printed circuit board (PCB) 520 or the like positioned within the mirror casing. As shown in FIG. 9, PCB element or switch or switches 518 may be positioned at a rearward side 520*a* of printed circuit board 520, and user input 516 may extend generally along the printed circuit board 520 and adjacent to a respective element or switch 518. Actuation of user input 516, such as via pushing or pressing user input 516 in the direction of the arrow A (FIG. 9), causes user input to move and/or flex to actuate the element or switch 518, as discussed below.

Similar to elements/switches 18, discussed above, electronic elements/switches 518 may be operable or actuatable to activate/deactivate or adjust or control an electrical accessory or component or feature or the like (such as the accessories or systems discussed below) associated with the printed circuit board or with the rearview mirror assembly or with the vehicle. The accessory or component or feature may be incorporated onto the printed circuit board 520 or may be positioned elsewhere in or at the mirror assembly or elsewhere in or at the vehicle, such as in an accessory module or windshield electronics module or the like, such as an accessory module or windshield electronics module of the type described in U.S. Pat. Nos. 6,824,281; 6,690,268; 6,250,148; 6,341,523; 6,593,565; and 6,326,613, which are all hereby incorporated herein by reference. Optionally, the user input or buttons may be positioned at a casing or housing of an accessory module or windshield electronics module or the like and may be actuatable or depressible to actuate an electronic element or switch incorporated into the accessory module or windshield electronics module or the like, without affecting the scope of the present invention.

As shown in FIG. 9, user input 516 may comprise an elongated lever arm with a downward extending exposed portion 516*a* (that is exposed or outside of the casing 511 and that is viewable and accessible by a user in the vehicle) and an element/switch actuating portion 516*b* within the casing 511. Casing 511 includes an opening or slot 511*a* through which user input 516 extends. User input 516 is formed such that when exposed portion 516*a* is pressed or moved by a user in the direction of the arrow A, a pivot portion 516*c* of user input 516 engages casing 511 at slot 511*a* to limit movement of the user input 516. When the user presses user input 516, the input or lever may pivot about the contact point or pivot point 517 between the casing 511 and pivot portion 516c to cause the element/switch actuating portion 516b to move forward (or to the right in FIG. 9) to engage and actuate the element or switch 518. When the user input 516 is released, the element/switch actuating portion 516b may move back to its initial position.

In the illustrated embodiment, the user input 516 includes a stop member or end 516d that may be generally at or may contact the printed circuit board 520 to limit movement of switch actuating portion 516b when user input 516 is actuated. During actuation of user input 516, stop end 516d limits forward movement of the upper or inner portion of the user input, whereby switch actuating portion 516b may flex to contact and actuate the element or switch 518. The mirror assembly 510 may also include a biasing member or cushioning member 522, which functions to bias or hold user input 516 in its non-actuated position or orientation when it is released. Biasing member 522 may press or bias or urge the switch actuating portion 516b toward the circuit board 520 so that stop end 516d is urged against the circuit board when the user input is released or not-actuated. The biasing member may comprise a foam spring or other type of spring or cushioning member or device, without affecting the scope of the present invention.

Optionally, mirror assembly 510 may include an illumination source 524 positioned on printed circuit board 520 and operable to illuminate the exposed portion 516a of user input 516. In the illustrated embodiment, illumination source 524 is positioned at end 516d of user input 516 and directs illumination toward and into end 516d of user input 516. User input 516 may comprises a plastic or polymeric material (such as a transparent or semi-transparent polymeric material) that is capable of transmitting light therealong or may comprise a light pipe or the like for transmitting the light from illumination source 520 along user input 516 to exposed portion 516a. The light from illumination source 520 thus may illuminate the exposed portion 516a of user input 516 to enhance viewability of the user input during darkened or nighttime conditions. As shown in FIGS. 10 and 11, the exposed portions 516a of the user inputs 516 may include icons or indicia or text or other graphics or the like printed or screened or otherwise formed thereon to identify the function of the switch associated with the user input to a user or occupant of the vehicle.

The user input of the present invention thus may comprise an elongated plastic or polymeric member that may be configured to pivot or flex relative to the mirror casing or the like to actuate an element or switch positioned within the casing, such as at a printed circuit board of the mirror assembly. The user input thus may not include moving parts or hinges or springs or the like typically associated with user actuatable switches or buttons or toggles or the like, and thus may provide a low cost user input or button or the like that is readily installable in or at a mirror assembly (or in or at an accessory module or windshield electronics module or the like) of a vehicle. The user input may be implemented in a mirror assembly having a casing and bezel portion, such as the types described in U.S. Pat. Nos. 6,439,755; 4,826,289; and 6,501,387; and/or U.S. patent application Ser. No. 10/933,842, filed Sep. 3, 2004, now U.S. Pat. No. 7,249,860; Ser. No. 10/993,302, filed Nov. 19, 2004, now U.S. Pat. No. 7,338,177; and/or Ser. No. 11/021,065, filed Dec. 23, 2004, now U.S. Pat. No. 7,255,451; and/or PCT Application No. PCT/US2004/015424, filed May 18, 2004 and published on Dec. 2, 2004 as PCT Publication No. WO 2004/103772, which are all hereby incorporated herein by reference.

As shown in FIGS. 1-3, 8 and 9, the reflective element of the mirror assembly may comprise a prismatic reflective element and the mirror assembly thus may comprise a prismatic mirror assembly, such as a prismatic mirror assembly of the types described in U.S. Pat. Nos. 6,318,870; 5,327,288; 4,948,242; 4,826,289; 4,436,371; and 4,435,042, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 and published on Apr. 1, 2004 as PCT Publication No. WO 2004/026633; and U.S. patent application Ser. No. 10/933,842, filed Sep. 3, 2004, now U.S. Pat. No. 7,249,860; Ser. No. 10/993,302, filed Nov. 19, 2004, now U.S. Pat. No. 7,338,177; and/or Ser. No. 11/021,065, filed Dec. 23, 2004, now U.S. Pat. No. 7,255,451; and/or Ser. No. 10/709,434, filed May 5, 2004, now U.S. Pat. No. 7,420,756, and/or PCT Application No. PCT/US2004/015424, filed May 18, 2004 and published on Dec. 2, 2004 as PCT Publication No. WO 2004/103772, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 6,227,675; 6,229,319; and 6,315,421 (the entire disclosures of which are hereby incorporated by reference herein), that can benefit from the present invention.

Optionally, and as shown in FIGS. 4-6, the reflective element of the mirror assembly may comprise an electro-optic or electrochromic reflective element, such that the mirror assembly may comprise an electro-optic or electrochromic mirror assembly. For example, the electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which are hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255,451; and/or PCT Application No. PCT/US03/29776, filed Sep. 9, 2003 and published on Apr. 1, 2004 as PCT Publication No. WO 2004/026633; and/or PCT Application No. PCT/US03/35381, filed Nov. 5, 2003 and published on May 21, 2004 as PCT Publication No. WO 2004/042457; and/or PCT Application No. PCT/US03/40611, filed Dec. 19, 2003 and published on Jul. 15, 2004 as PCT Publication No. WO 2004/058540, and/or U.S. provisional applications, Ser. No. 60/630,061, filed Nov. 22, 2004; Ser. No. 60/629,926, filed Nov. 22, 2004; Ser. No. 60/531,838, filed Dec. 23, 2003; Ser. No. 60/553,842, filed Mar. 17, 2004; and Ser. No. 60/563,342, filed Apr. 19, 2004, which are all hereby incorporated herein by reference. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in PCT Application No. PCT/US03/29776, filed Sep. 9, 2003 and published on Apr. 1, 2004 as PCT Publication No. WO 2004/026633, which are all hereby incorporated herein by reference.

The manual inputs or user actuatable inputs or actuators may control or adjust or activate/deactivate one or more accessories or elements or features. Optionally, the mirror assembly may include one or more accessories incorporated onto the printed circuit board or positioned elsewhere at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot or object detection system, such as imaging or detection systems of the types disclosed in U.S. Pat. Nos. 5,929,786 and/or 5,786,772, and/or U.S. patent application Ser. No. 10/427,051, filed Apr. 30, 2003, now U.S. Pat. No. 7,038,577, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093; and/or U.S. provisional applications, Ser. No. 60/607,963, filed Sep. 8, 2004; and Ser. No. 60/562,480, filed Apr. 15, 2004, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 and published on Jul. 15, 2004 as PCT Publication No. WO 2004/058540, and/or U.S. provisional applications, Ser. No. 60/630,061, filed Nov. 22, 2004, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004, now U.S. Pat. No. 7,023,322), lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381, microphones, such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, and published on Apr. 15, 2004 as PCT Publication No. WO 2004/032568, speakers, a compass or compass system, such as disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003, now U.S. Pat. No. 7,004,593; and/or U.S. provisional application, Ser. No. 60/636,931, filed Dec. 17, 2004, a navigation system, such as described in U.S. Pat. No. 6,477,464, and U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published on Jul. 15, 2004 as PCT Publication No. WO 2004/058540, a tire pressure monitoring system, such as the types disclosed in U.S. Pat. Nos. 6,294,989; 6,445,287; and/or 6,472,979, and U.S. provisional application, Ser. No. 60/611,796, filed Sep. 21, 2004, a seat occupancy detector, a vehicle occupancy detector, such as the type described in U.S. provisional application, Ser. No. 60/630,364, filed Nov. 22, 2004, a trip computer, a telematics system, such as an ONSTAR® system or the like, and/or any other desired accessory or system or the like (with all of the above-referenced patents and patent applications and PCT applications and provisional applications being commonly assigned to Donnelly Corporation, and with the disclosures of all of the above referenced patents and patent applications and PCT applications and provisional applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003, now U.S. Pat. No. 7,004,593, which is hereby incorporated herein by reference, without affecting the scope of the present invention.

Figure 12:
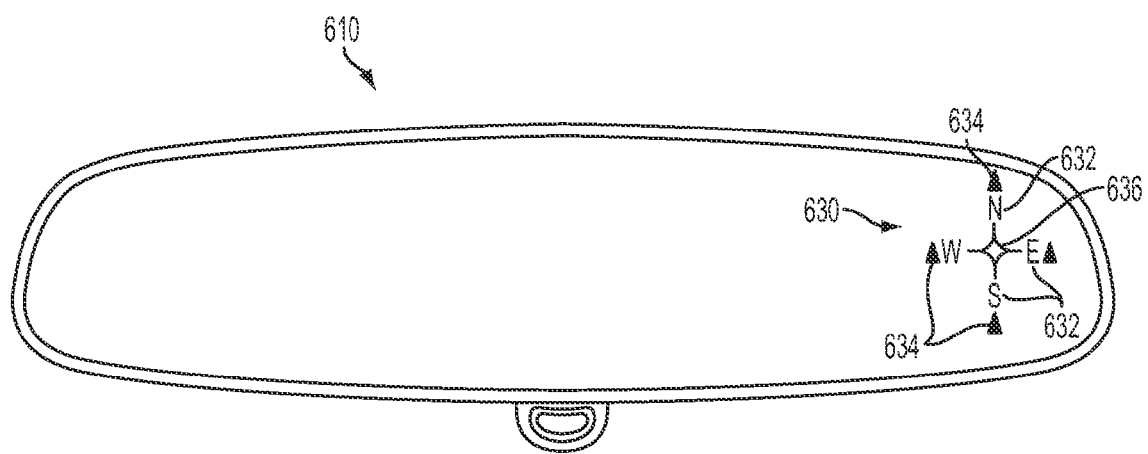
FIG. 12 is a front elevation of another rearview mirror assembly, showing a compass display in accordance with the present invention.
Figure 13:
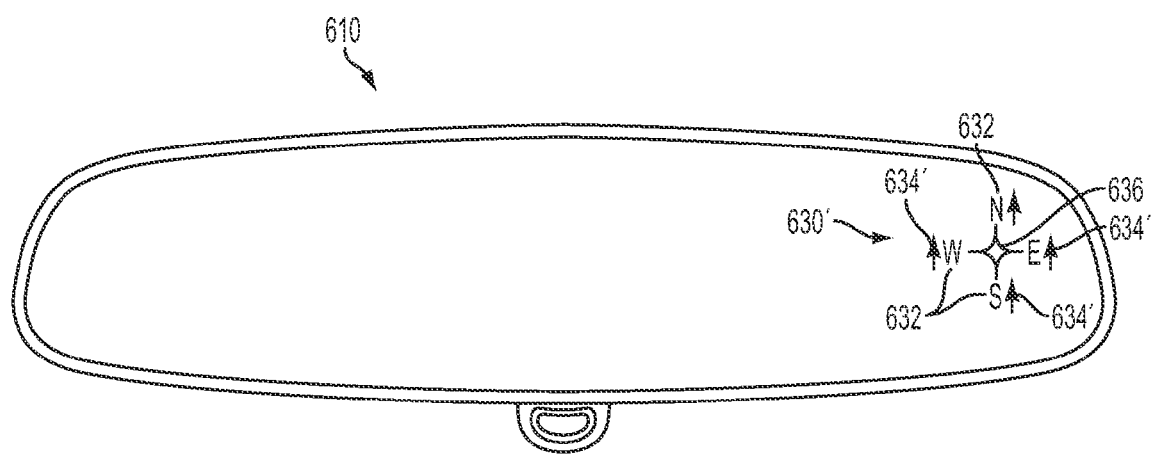
FIG. 13 is a front elevation of another rearview mirror assembly, showing another compass display in accordance with the present invention.
Figure 14:
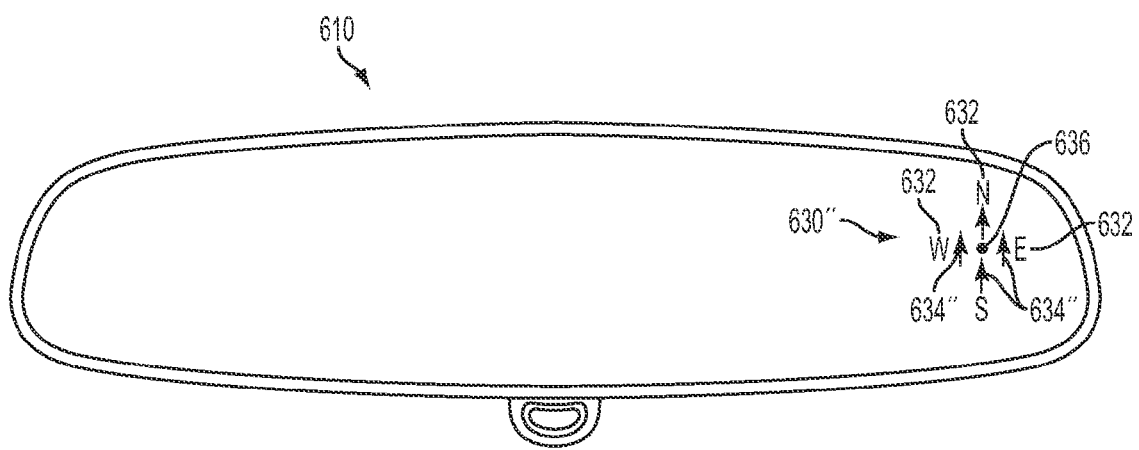
FIG. 14 is a front elevation of another rearview mirror assembly, showing another compass display in accordance with the present invention.

Optionally, and with reference to FIGS. 12-14, an interior rearview mirror assembly 610 may include an intuitive heading instructional icon element or display 630 at the reflective element 614, such as the types described in U.S. provisional application, Ser. No. 60/553,517, filed Mar. 16, 2004, which is hereby incorporated herein by reference. The compass display 630 may be associated with or controlled or adjusted by a compass system and/or a navigational system, such as a compass and/or navigational system of the types described in U.S. Pat. Nos. 6,678,614; 6,477,464; 5,924,212; 4,862,594; 4,937,945; 5,131,154; 5,255,442; and/or 5,632,092, and/or U.S. patent application Ser. No. 10/456,599, filed Jun. 6, 2003, now U.S. Pat. No. 7,004,593; Ser.

No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published on Jul. 15, 2004 as PCT Publication No. WO 2004/058540; and/or PCT Application No. PCT/US2004/015424, filed May 18, 2004 and published on Dec. 2, 2004 as PCT Publication No. WO 2004/103772, and/or U.S. provisional application, Ser. No. 60/636,931, filed Dec. 17, 2004, which are all hereby incorporated herein by reference.

Display 630 includes a plurality of characters or icons or letters 632 (such as N, E, S, W as shown in FIGS. 12-14) formed or etched in the reflective coating or layer of the reflective element 614 and includes an arrow or direction pointer 634 at each of the characters 632. The display 630 may also include a central port 636 through the reflective coating or layer reflective element 614 behind which may be positioned an illumination source as described above or a glare sensor, such as a photo sensor or the like, such as a glare sensor and/or an ambient light sensor and electrochromic automatic dimming circuitry described in U.S. Pat. Nos. 4,793,690 and 5,193,029, and U.S. patent application Ser. No. 10/456,599, filed Jun. 6, 2003, now U.S. Pat. No. 7,004,593, which are all hereby incorporated herein by reference. The arrows of direction pointers may point generally upward when the mirror assembly is mounted in the vehicle with the reflective element facing generally rearward and opposite to the direction of forward travel of the vehicle. The arrows or pointers thus may be representative of the direction of forward travel of the vehicle. As shown in FIGS. 12-14, the direction pointers of display 630 may comprise generally triangular shaped icons or pointers 634 positioned outward from the characters 632 and opposite the characters from the center or port 636 of the display (such as shown in FIG. 12), or the direction pointers of the display 630' may comprise arrows 634' positioned next to the characters 632 (such as shown in FIG. 13), or the direction pointers of the display 630" may comprise arrows 634" positioned inward of the characters 632 and between the respective characters and the center or port 636 (such as shown in FIG. 14).

The compass/navigation system may be operable to energize one or more illumination sources positioned at and rearward of a respective one of the characters 632 and corresponding direction pointer 634 to illuminate or back light the respective character and direction pointer. For example, the compass/navigation system may be operable to illuminate or back light a particular character and adjacent direction pointer to indicate to an occupant of the vehicle the direction that the vehicle is currently heading. For example, if the character "W" and the arrow or direction pointer next to the "W" are illuminated, then the display indicates that the vehicle is heading west. The intuitive heading instructional icon element or display thus may provide reinforcement to a viewer that when the character (such as "W" or other character) is illuminated, it is done so to indicate that the vehicle is traveling in the direction (such as west or other direction) indicated by the character. This is reinforced by the illumination of the corresponding arrow or direction pointer that points upward so as to be representative of pointing in the direction of forward travel of the vehicle. A person viewing the display thus will not misinterpret the illumination of the characters to be indicative of a driving or turning instruction (such as an instruction to turn the vehicle right or east to follow a programmed route) in connection with the navigation system.

Optionally, the display may function as a display for providing both an indication of the directional heading of the vehicle and an indication of which direction the vehicle should be turned in order to follow a programmed route or path. For example, only a particular direction pointer may be illuminated or back lit to indicate that the vehicle is heading in the direction indicated by the non-lit character next to the illuminated pointer, while a different character (separate from the illuminated pointer) may be illuminated or back lit to indicate that the vehicle is to be turned in that direction to follow a programmed route to a desired destination. The compass/navigation system and display thus may clearly display to a driver of the vehicle which direction the vehicle is heading at that time via the directional arrows, while the compass/navigation system and display may also be operable to provide driving or turning instructions to a driver of the vehicle to instruct the driver as to which direction the driver is to turn to follow a particular route to a desired destination. For example, the compass/navigation system may be associated with a global positioning system and/or telematics system of the vehicle, and may generate and display driving instructions to the driver of the vehicle as the vehicle is driven along a generated route, such as by utilizing aspects described in U.S. Pat. Nos. 6,678,614 and/or 6,477,464, and/or U.S. patent application Ser. No. 10/456,599, filed Jun. 6, 2003, now U.S. Pat. No. 7,004,593; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published on Jul. 15, 2004 as PCT Publication No. WO 2004/058540; and/or PCT Application No. PCT/US2004/015424, filed May 18, 2004 and published on Dec. 2, 2004 as PCT Publication No. WO 2004/103772, which are all hereby incorporated herein by reference.

During operation, the compass/navigation system thus may be operable to energize an illumination source positioned at and rearward of/behind a respective one of the characters to provide a driving instruction to the driver of the vehicle that is separate from the directional heading indication also provided by illumination or back lighting of the arrows or pointers of the display. For example, if the vehicle is heading generally west, the compass/navigation system may illuminate or back light the arrow next to the "W" to indicate to the driver of the vehicle that the vehicle is traveling generally in that direction. If the programmed route for the vehicle involves an upcoming right turn onto a generally northbound road, the compass/navigation system may then illuminate or back light the letter "N" to indicate to the driver of the vehicle that the driver should turn the vehicle to head north.

It is further envisioned that the illuminated character may be altered or adjusted as the vehicle gets closer to the turning point or intersection, such as by flashing the illumination source or intensifying the illumination source or changing the color of the illumination as the vehicle approaches the desired or appropriate turning point or intersection. It is also further envisioned that arrows pointing sideways may be provided at one or more of the characters of the display (or elsewhere at the display), and the appropriate arrow may be illuminated or back lit to indicate that the driver is to turn right or left to stay on the desired course or route. In such an embodiment, illumination or back lighting of the character may be indicative of the directional heading of the vehicle, while illumination or back lighting of the arrows may be indicative of the driving instructions to the driver of the vehicle.

The intuitive display elements thus provide a clear indication as to which direction the vehicle is presently traveling by providing a directional heading arrow or pointer at each of the compass heading characters. The driver of the vehicle thus will not likely become confused as to the meaning of the illuminated characters or letters. The compass/navigation system and display of the present invention also may provide point-to-point driving instructions and the present directional heading of the vehicle with the same display or display icons/characters.

Optionally, a variety of display types or screens can be utilized in conjunction with an interior rearview mirror assembly or windshield electronics module/accessory module of the present invention. For example, any of the liquid crystal type display or video screens (such as the types disclosed in PCT Application No. PCT/US03/40611, filed Dec. 19, 2003 and published on Jul. 15, 2004 as PCT Publication No. WO 2004/058540, and/or U.S. provisional application, Ser. No. 60/630,061, filed Nov. 22, 2004, which are hereby incorporated herein by reference) can be utilized. Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs can be used to write several million red, green, and blue spots that integrate to form a single high-fidelity image in a mega pixel display image. Such scanning display technologies can utilize a biaxial microelectromechanical scanner (MEMS) and other display/mechanical and electronic devices, such as are disclosed in U.S. Pat. Nos. 6,714,331; 6,795,221; and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent application Ser. No. 10/225,851, filed Aug. 22, 2002, now U.S. Pat. No. 6,847,487, which is hereby incorporated herein by reference.

If the mirror reflector of the mirror element is of the transflective (substantially reflective and at least partially transmitting to light) type, the driver or other occupant in the interior cabin of the vehicle can view the image (being back-projected onto the rear of the mirror reflective element) by viewing the mirror reflective element. Because such back-projected microdisplays can have a very high image brightness (due to use of very high brightness LEDs as illuminators), image wash-out during driving under high ambient lighting conditions (such as on a sunny day) is reduced using such scanning image microdisplay technology compared to use, for example, of TFT LCD displays.

Also such MEMS technology can be used in a heads-up-display (HUD) system, such as the MicroHUD™ head-up display system available from MicroVision Inc. of Bothell, Wash. This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system, such as the types described in U.S. Pat. No. 5,929,786, and/or U.S. patent application Ser. No. 10/427,051, filed Apr. 30, 2003, now U.S. Pat. No. 7,038,577; and/or Ser. No. 10/209,173, filed Jul. 31, 2002, now U.S. Pat. No. 6,882,287, and/or U.S. provisional application, Ser. No. 60/638,687, filed Dec. 23, 2004, which are hereby incorporated herein by reference.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, the interior rearview mirror assembly of the vehicle may include or may be associated with an accessory that includes or is associated with a sensor adapted for detection of the presence of moisture on the inner surface of the windshield of the vehicle. The accessory may activate a heating, ventilation and air conditioning (HVAC) system (such as by turning on a vehicular air conditioning or a heating system and/or turning on an air blower that directs air to the inner surface of the windshield for demisting/decondensation purposes) in response to a threshold level of moisture being detected. Such an interior mirror demisting sensor accessory (accommodated, for example, in a mirror mount or mirror support arm proximate where the mirror assembly mounts to an attachment member, such as a mirror-mounting button that is adhered to the inner surface of the windshield, or accommodated in a pod that attaches to a mirror mount/mirror support arm) is preferably a capacitive moisture sensor for detecting surface condensation, such as is disclosed in U.S. Pat. No. 6,614,241, issued to Schmitt et al., the entire disclosure of which is hereby incorporated by reference herein. Such a compact capacitive moisture sensor may comprise a carrier, a metal layer applied to the carrier to form an interdigital structure, a passivation layer formed over the metal layer, and a hydrophilic layer applied over the passivation layer, where the hydrophilic layer increases a surface tension of the passivation layer. Such a sensor is available from Preh-Werke GmbH & Co. KG of Saale, Germany. Optionally, such a capacitive sensor may be mounted proximate to the windshield of the vehicle, such as in a windshield electronics/accessory module, such as disclosed in U.S. Pat. Nos. 6,824,281; 6,290,268; 6,250,148; 6,341,523; 6,593,565; and 6,326,613, which are all hereby incorporated herein by reference, without affecting the scope of the present invention.

Optionally, the mirror assembly may also or alternately include a cabin air monitor for monitoring the air within the vehicle cabin. For example, and as disclosed in U.S. Pat. No. 6,428,172, which is hereby incorporated herein by reference, a vehicle cabin air monitor can be incorporated into an interior mirror assembly, such as within a mirror housing that includes the reflective element, or in a pod or housing that attaches to the mirror mount. Alternately, such a vehicle cabin air monitor can be included in windshield electronics module/accessory module, without affecting the scope of the present invention. For example, levels of carbon monoxide may be monitored by such air monitors provided at the mirror location or accessory module location. Preferably, the air monitor includes an intake, preferably a fan assisted intake that samples the air within the cabin. In a preferred form, when the vehicle cabin level of carbon monoxide exceeds a threshold level, the monitor takes appropriate action, such as, for example, sounding an alarm, shutting off the engine, and/or opening windows of the vehicle or the like. Such an air monitoring system is preferably used with a remote ignition system, such as is commonly used in cold climates when the engine is started up remotely. Such a vehicle air monitoring system protects against the buildup of carbon monoxide within the vehicle cabin and protects against the threat of carbon monoxide poisoning to a human being or other animal within the vehicle cabin.

Optionally, for example, an interior mirror assembly or a pod attached thereto or a windshield electronics module/accessory module can include an in-cabin humidity detector (such as the type described above) that draws in cabin air via a small fan, detects the humidity level, and then determines whether or not to turn on the HVAC blower to demist the windshield. Such an accessory or system may include a carbon monoxide monitor (such as described above) to determine the level of carbon monoxide in the vehicle cabin.

The user actuatable inputs of the present invention may be operable to control any of the accessories of or associated with the mirror assembly and/or accessory module or the like. Optionally, the mirror assembly and/or accessory module and/or console or the like may include other user inputs or actuating devices, without affecting the scope of the present invention. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, now U.S. Pat. No. 7,224,324, which are hereby incorporated herein by reference, or such as proximity sensors of the types described in U.S. Pat. Publication No. 2002/0044065, published Apr. 18, 2002, now U.S. Pat. No. 7,224,324; and/or U.S. patent application Ser. No. 10/933,842, filed Sep. 3, 2004, now U.S. Pat. No. 7,249,860; and/or Ser. No. 10/956,749, filed Oct. 1, 2004, now U.S. Pat. No. 7,446,924; and/or PCT Application No. PCT/US03/40611, filed Dec. 19, 2003 and published on Jul. 15, 2004 as PCT Publication No. WO 2004/058540, which are hereby incorporated herein by reference, or such as membrane type switches, such as described in U.S. provisional applications, Ser. No. 60/575,904, filed Jun. 1, 2004; and/or Ser. No. 60/624,320, filed Nov. 2, 2004, which are hereby incorporated herein by reference, or such as detectors and the like, such as the types disclosed in U.S. Pat. Nos. 6,504,531; 6,501,465; 6,492,980; 6,452,479; 6,437,258; and 6,369,804, and/or U.S. patent application Ser. No. 11/021,065, filed Dec. 23, 2004, now U.S. Pat. No. 7,255,451, which are hereby incorporated herein by reference, and/or the like, without affecting the scope of the present invention.

As disclosed in U.S. patent application Ser. No. 09/817,874, filed Mar. 26, 2001 by Quist et al. for INTERACTIVE AUTOMOTIVE REARVISION SYSTEM, now U.S. Pat. No. 7,224,324, incorporated above, and as shown in the FIGS. 15-18, a plurality of user interfaces for a plurality of functions are provided as touch sensitive locations provided on the front surface of the reflective element housed in the casing of an interior mirror assembly. Interior mirror assemblies suitable to use in this present invention typically comprise a reflective element housed in a casing, and with that casing pivotably attaching to a support that mounts to a vehicle windshield or header area, such as are disclosed in U.S. Pat. Nos. 5,820,097; 5,615,857; 5,330,149; 5,100,095; 4,930,742; 4,936,533; 5,487,522; 5,615,857; and 5,671,996, which are commonly assigned to Donnelly Corporation. In addition, the interior mirror assembly may include displays (such as described in pending U.S. Pat. application entitled REARVIEW MIRROR ASSEMBLY WITH ADDED FEATURE MODULAR DISPLAY, filed Nov. 24, 1999, by Timothy Skiver et al., now U.S. Pat. No. 6,329,925) and lights (such as map lights, such as disclosed in such as disclosed in U.S. Pat. Nos. 5,938,321; 5,813,745; 5,820,245; 5,673,994; 5,649,756; or 5,178,448).

Figure 19:
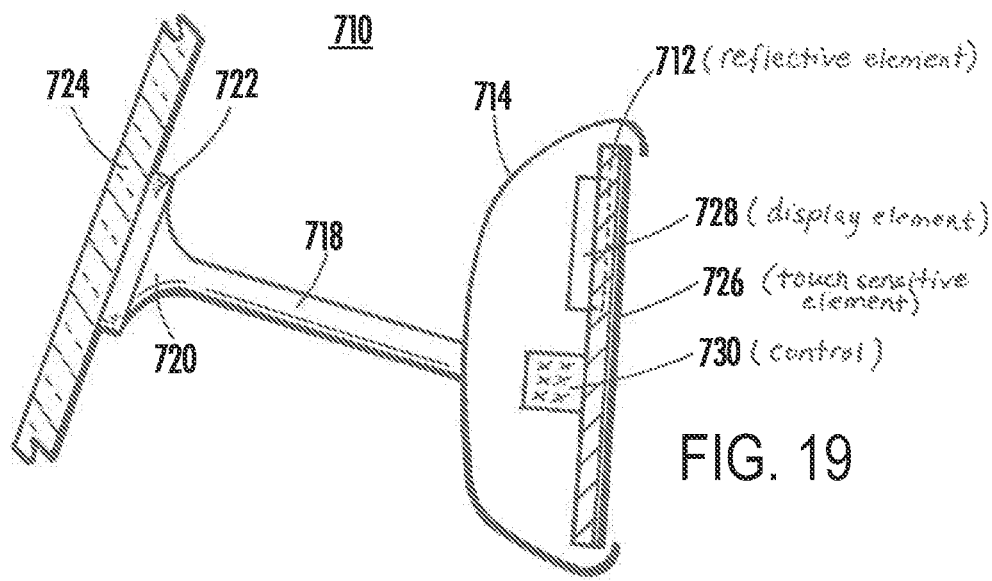
FIG. 19 is a side elevation schematic view of an interactive automotive rear vision system of the present invention.

A schematic of an interactive rearview mirror system 710 is shown in FIG. 19. Mirror system 710 includes an interior mirror assembly 711, which incorporates a reflective element 712. Reflective element 712 is housed in a casing 714, which is mounted to an interior portion of a vehicle, such as vehicle windshield 724, by a support arm 718. Optionally, casing 714 is pivotably mounted to support arm 718, which attaches via a mount 720 to a mounting button 722 that is adhered to vehicle windshield 724 (note that alternately, mounting, of the assembly can be to the header region of the vehicle, as known in the mirror arts and/or can be a single pivot/ball joint or a two pivot/ball joint). Examples of suitable mounting arrangements can be found in U.S. Pat. Nos. 5,487,522; 5,671,996; 5,820,097; 5,615,857; 5,330,149; 5,100,095; 4,930,742; or 4,936,533 or U.S. patent application Ser. No. 08/781,408, filed Jan. 10, 1997, all commonly assigned to Donnelly Corporation.

The outermost or front surface of reflective element 712 comprises a selector element, such as a touch sensitive element 726. For suitable touch sensitive elements, reference is made to U.S. Pat. Nos. 6,001,486; and 6,087,012, and U.S. provisional application Ser. No. 60/213,663, filed Jun. 23, 2000; Ser. No. 60/231,096, filed Sep. 8, 2000; Ser. No. 60/239,788, filed Oct. 12, 2000; Ser. No. 60/234,867, filed Sep. 22, 2000; Ser. No. 60/244,577, filed Oct. 31, 2000, which are all commonly assigned to Donnelly Corporation of Holland, Mich.

Optionally, a display element 728 (and most preferably a reconfigurable display element) is mounted at the rearmost or outermost surface of reflective element 712 so as to be at least partially (preferably substantially and most preferably fully) viewed through reflective element 712. However, other locations for display elements are possible, such as mounting to the side of, above, or below reflective element 712, such as is disclosed in U.S. patent application Ser. No. 09/793,002, filed Feb. 26, 2001, now U.S. Pat. No. 6,690,268.

For examples of locations of such displays and/or user interfaces and/or other accessories, including video screens, which are disclosed in U.S. patent application Ser. No. 60/186,520, filed Mar. 1, 2000, microphones and/or speakers, which are disclosed in U.S. patent application Ser. No. 09/361,814, filed Jul. 27, 1999, and Ser. No. 09/199,907, filed Nov. 25, 1998, sound processing systems, including digital sound processing systems, which are disclosed in U.S. patent application Ser. No. 09/466,010, filed Dec. 17, 1999, Ser. No. 09/396,179, filed Sep. 14, 1999, Ser. No. 09/382,720, filed Aug. 25, 1999, Ser. No. 09/449,121, filed Nov. 24, 1999, Ser. No. 09/433,467, filed Nov. 4, 1999, and Ser. No. 09/448,700, filed Nov. 24, 1999, displays, including tire pressure sensor system displays, compass sensors and displays, temperature displays, which are disclosed in U.S. patent application Ser. No. 09/244,726, filed Feb. 5, 1999 and in U.S. patent application Ser. No. 09/449,121, filed Nov. 24, 1999, and U.S. Pat. No. 5,530,240, a communication module, which is disclosed in U.S. Pat. No. 5,798,688, blind spot detection systems, which are disclosed in U.S. Pat. Nos. 5,929,786 or 5,786,772, transmitters and/or receivers, including garage door openers and a digital network, which are described in U.S. Pat. No. 5,798,575, a memory mirror system, which is disclosed in U.S. Pat. No. 5,796,176, U.S. Pat. No. 5,798,575, U.S. Pat. No. 5,812,321, U.S. Pat. No. 5,786,772, and U.S. Pat. No. 5,959,367 and in U.S. patent application Ser. No. 09/448,690, filed Nov. 24, 1999 and Ser. No. 09/341,450, filed Jul. 8, 1999; such as a hands-free phone attachment, a video device for internal cabin surveillance and/or video telephone function, which are disclosed in U.S. Pat. Nos. 5,760,962 and 5,877,897 and U.S. patent application Ser. No. 09/433,467 and U.S. patent application Ser. No. 08/918,772, filed Aug. 25, 1997, vehicle navigation systems, which are described in provisional application Ser. No. 60/131,593, filed Apr. 29, 1999, map lights, including maps lights incorporating light emitting diodes (including organic light emitting diodes) generating a white light beam, which are disclosed in U.S. Pat. Nos. 5,938,321; 5,813,745; 5,820,245; 5,673,994; 5,649,756; 5,178,448; 5,669,698; 5,671,996; 4,733,336; and 4,646,210, microphones and/or speakers, which are disclosed in U.S. Pat. application Ser. No. 09/361,814, filed Jul. 27, 1999, and Ser. No. 09/199,907, filed Nov. 25, 1998, a compass, which is disclosed in U.S. Pat. No. 5,924,212, GPS displays and systems, which are disclosed in U.S. Pat. No. 5,971,552 and pending U.S. Pat. Applications, Ser. No. 60/187,960, filed Mar. 9, 2000, and Ser. No. 60/131,593, filed Apr. 29, 1999, cameras, including video cameras, which are disclosed in U.S. Pat. No. 5,877,897, U.S. Pat. No. 5,760,962, U.S. Pat. No. 5,959,367, U.S. Pat. No. 5,929,786, U.S. Pat. No. 5,949,331, U.S. Pat. No. 5,914,815, U.S. Pat. No. 5,786,772, U.S. Pat. No. 5,798,575, and U.S. Pat. No. 5,670,935, and U.S. patent application Ser. No. 09/304,201, filed May 3, 1999, Ser. No. 09/375,315, filed Aug. 16, 1999, Ser. No. 09/199,907, filed Nov. 25, 1998, Ser. No. 09/361,814, filed Jul. 27, 1999, Ser. No. 09/372,915, filed Aug. 12, 1999, Ser. No. 09/300,201, filed May 3, 1999, Ser. No. 09/313,139, filed May 17, 1999, Ser. No. 09/361,814, filed Jul. 27, 1999, Ser. No. 09/199,907, filed Nov. 25, 1998, and Ser. No. 09/422,467, filed Nov. 4, 1999, head lamp controllers, which are disclosed in U.S. patent application Ser. No. 09/441,341, filed Nov. 16, 1999, telematic interfaces, which are disclosed in U.S. patent application Ser. No. 08/918,772, filed Aug. 25, 1997, storage and pendant accessories, which are disclosed in U.S. patent application Ser. No. 09/449,121, filed Nov. 24, 1999, rain sensors, including non-contacting rain sensors, which are disclosed U.S. Pat. No. 4,973,844 and PCT International Application PCT/US94/05093, published as WO 94/27262 on Nov. 24, 1994, toll pay devices, including automatic toll pay devices or remote transaction systems, which are disclosed in U.S. Pat. No. 6,158,655 and application Ser. No. 09/687,778, filed Oct. 13, 2000, trip computers, vehicle status displays, air bag activation status displays, instrumentation/console lighting, and other information display/user interface devices, which are disclosed U.S. patent application Ser. No. 09/244,726, filed Feb. 5, 1999.

Figure 20:
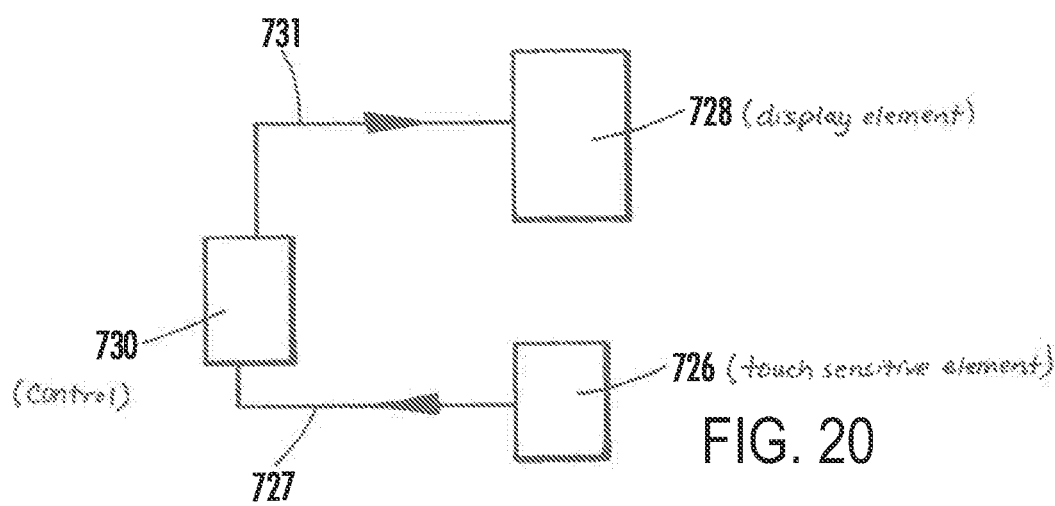
FIG. 20 is a schematic of a user interaction with a touch sensitive element.
Figure 23:
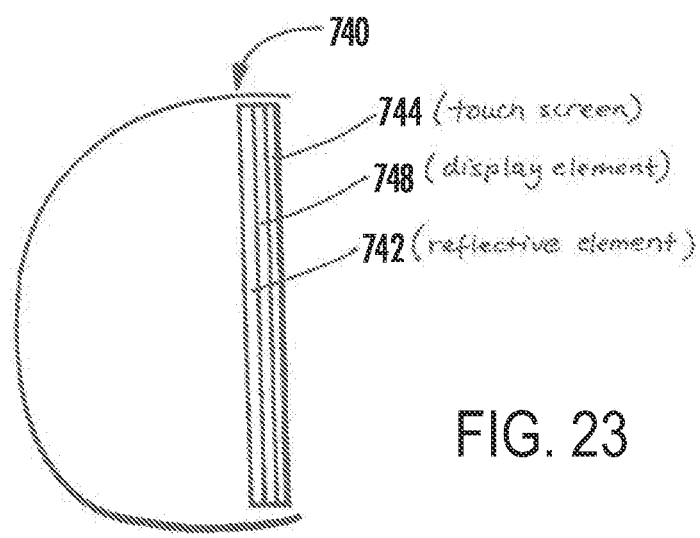
FIG. 23 is a schematic cross-sectional view of an interior rearview mirror assembly of the interactive automotive rear vision system of the present invention.

Interactive mirror system 710 includes a control 730 that most preferably is located within casing 714. As shown schematically in FIG. 20, user interaction with touch sensitive element 726 (such as by touching or at least closely approaching with a human finger or, less preferably, by touching with a stylus or at least closely approaching with a stylus), preferably a transparent touch sensitive element, generates an output signal 727 indicative of user interaction that is input to control 730. In response, control 730 provides an output 731 to display element 728 to cause display element 728 to display the vehicle function or information desired by the driver. Display element 728 may perform a single display function or multiple display functions, such as providing indication of a vehicle function or functions, including a family of functions of a plurality of family of functions, for example a compass mirror display function, a temperature display function, a tire pressure/status display function, a status of inflation of tires display function, a GPS/navigation system function, a telematic function, computer display function, including e-mails and INTERNET access, a passenger air bag disabled display function, an automatic rain sensor operation display function, telephone dial information display function, highway status information display function, blind spot indicator display function, or the like.

Thus, and in accordance with present invention, a cognitive relationship is established between the touching of the touch sensitive element and generation of the display image on an adjacent or co-located display element, and most preferably, with the display element positioned behind at least a partially transparent touch sensitive element, such that activation of the touch sensitive element causes the display element to emit an image at least partially visible and preferably substantially visible through the transparent touch sensitive element.

Such displays may be an alpha-numeric display or a multi-pixel display, and may be fixed or scrolling. In addition, display element 728 may comprise an incandescent display, vacuum fluorescent display, electroluminescent display, light emitting diode display, cathode ray tube display, field emission display, E-ink display, or organic emitting polymer display or the like. Examples of display elements may be found in application Ser. No. 09/244,726, filed Feb. 5, 1999, or U.S. Pat. No. 5,530,240, and U.S. patent application Ser. No. 09/433,467 filed Nov. 4, 1999, commonly assigned to Donnelly Corporation.

Figure 15:
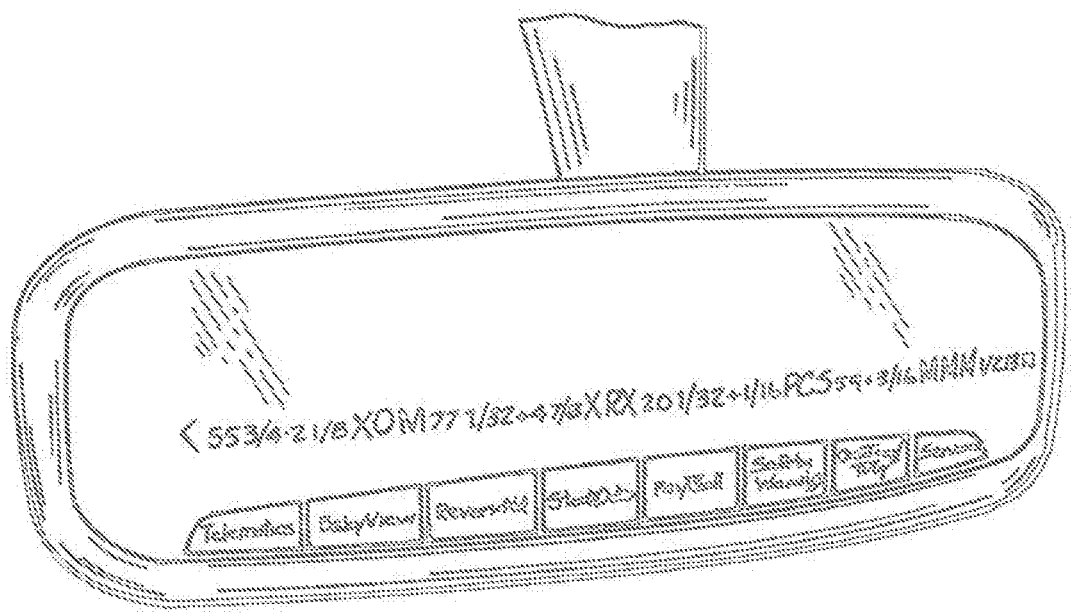
FIG. 15 is a front elevation view of an interactive automated rear vision system of the present invention which incorporates a display, which in the illustrated embodiment displays scrolling information.

Referring to FIG. 15, the reflective element 712 of interior rearview mirror assembly 711 shown includes a touch sensitive portion on its front surface formed by a plurality of touch sensitive elements 726. Each touch sensitive element 726 has a function associated with it. For example, touch sensitive elements 726 may have associated therewith functions relating to an activity, including internal and external activities, such as video conferencing, internal or external cabin surveillance, remote transactions, or the like, or internal or external information, such as vehicle status information, weather information, stock information, messaging, or the like. Thus, for example, the driver can reach up and touch one of the touch sensitive elements 726, which in the illustrated embodiment are identified as "TELEMATICS," "BABY VIEW," "REVERSE AID," "STOCK QUOTES," "PAY TOLL," "SAFETY WARNING," "COMP/TEMP DATA," "SERVICE" in order to activate and/or inquire of a particular function or item. As shown in FIG. 15, a stock quote is displayed on display 728 in response to the driver touching the "STOCK QUOTES" section or touch sensitive element of the mirror reflector element surface. When this particular area of the front of the reflective element is touched by a driver, an input is provided by touch sensitive element 726 to control 730 indicating that the driver desires a stock quote. Optionally, and desirably, control 730 can cause displays of other sections of the reflective element to reconfigure to show particular company stock identifiers (such as "DON" or "IBM" or the like), and thus inviting the driver to make a further touch selection of a particular company's stock. Once control 730 knows which stock is of interest, control 730 initiates a wireless connection to a remote telecommunication system such as ONSTAR™ available from General Motors Corporation, Detroit, Mich. or RESCU™ available from Ford Motor Company, Detroit, Mich. or makes a wireless connection to the INTERNET to access a stock quote site on the worldwide Web. Upon receiving back from the remote site the stock quote information, control 730 outputs this to display element 728 to display an image to the driver as illustrated in FIG. 15. As shown, display 728 may display the stock information in a scrolling display, such as a "ticker type" display, and most preferably a "display on demand" which is behind a substantially reflective portion and significantly light transmitting portion of the reflective element (and such as described in U.S. Pat. Nos. 5,668,663 and 5,724,187). Using prompts displayed to the driver by display element 728, the driver can use touch sensitive element 726 or other touch activated devices to move between items or page between menu pages. Once the stock quoting activity is completed, the driver can page back to a standard menu of selection items, such as that shown in FIGS. 15-18.

Figure 16:
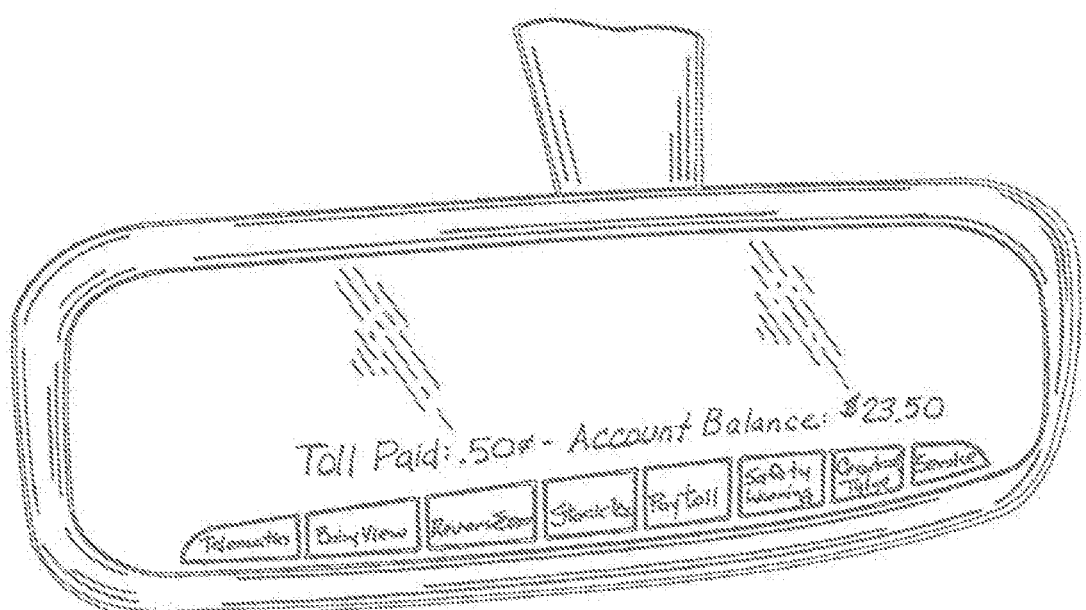
FIG. 16 is a similar view to FIG. 15 of the interactive automotive rear vision system illustrating the display displaying different information.

When driving to approach a toll station, the driver can select a "PAY TOLL" touch input section of the reflective element. This causes control 730 to initiate two-way wireless communication with a remote toll booth payment site, and the receipt for any toll paid along with any account balance remaining can be displayed such as illustrated in FIG. 16. For examples of suitable remote transaction systems, reference is made herein to U.S. Pat. No. 6,158,655 and application Ser. No. 09/687,778, filed Oct. 13, 2000.

Optionally, the vehicle is equipped with a camera, such as a baby minder camera, such as is described in co-assigned U.S. patent application Ser. No. 09/466,010, filed Dec. 17, 1999; Ser. No. 09/396,179, filed Sep. 14, 1999; Ser. No. 09/382,720, filed Aug. 25, 1999; Ser. No. 09/449,121, filed Nov. 24, 1999; Ser. No. 09/433,467, filed Nov. 4, 1999; Ser. No. 09/448,700, filed Nov. 24, 1999, and Ser. No. 09/793,002, filed Feb. 26, 2001, now U.S. Pat. No. 6,690,268. By touching the "BABY VIEW" portion of touch sensitive element 726, the view of a baby seated at a rear seat is displayed by display element 728 (FIG. 17).

Figure 17:
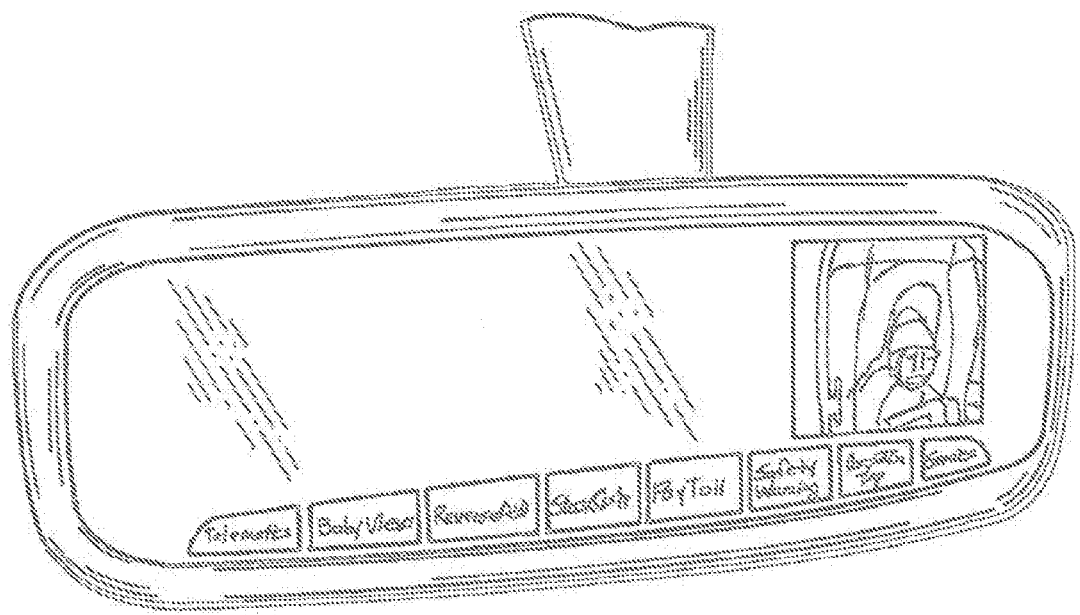
FIG. 17 is another embodiment of an interactive automotive rear vision system incorporating a video display, which in the illustrated embodiment illustrates a baby view images.
Figure 18:
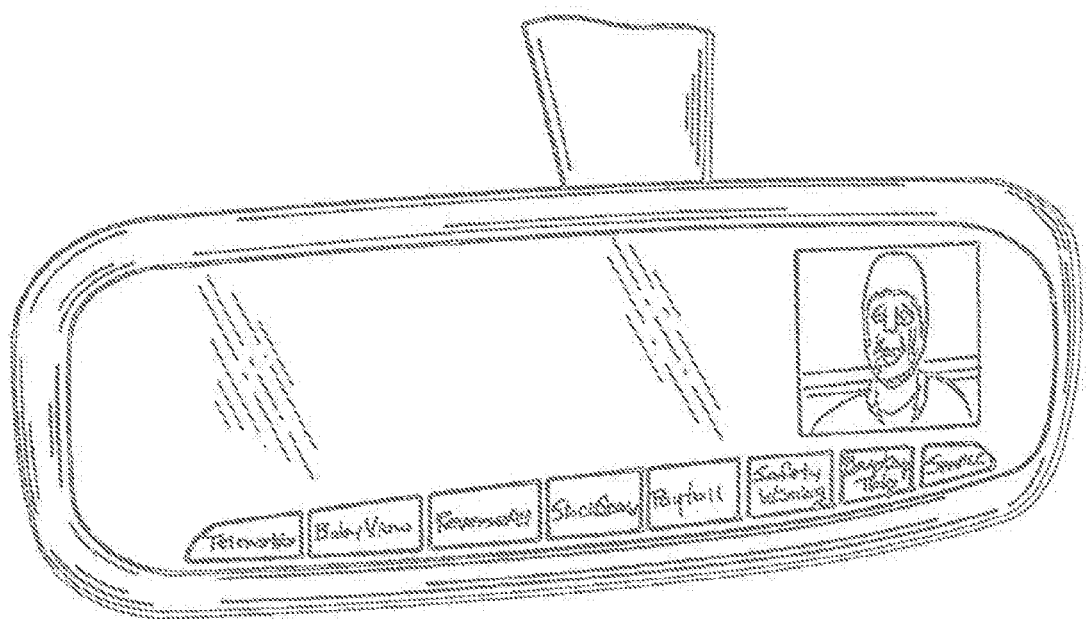
FIG. 18 is a similar view to FIG. 17 of the display displaying video images of a telematic system.

As shown in FIG. 17, selection of the "TELEMATICS" portion of touch sensitive element 726 causes control 730 to initiate a video phone link, with the image of the remote party being displayed at reflective element 712 by display element 728, such as described in U.S. Pat. Nos. 5,760,962 and 5,877,897.

Figure 21:
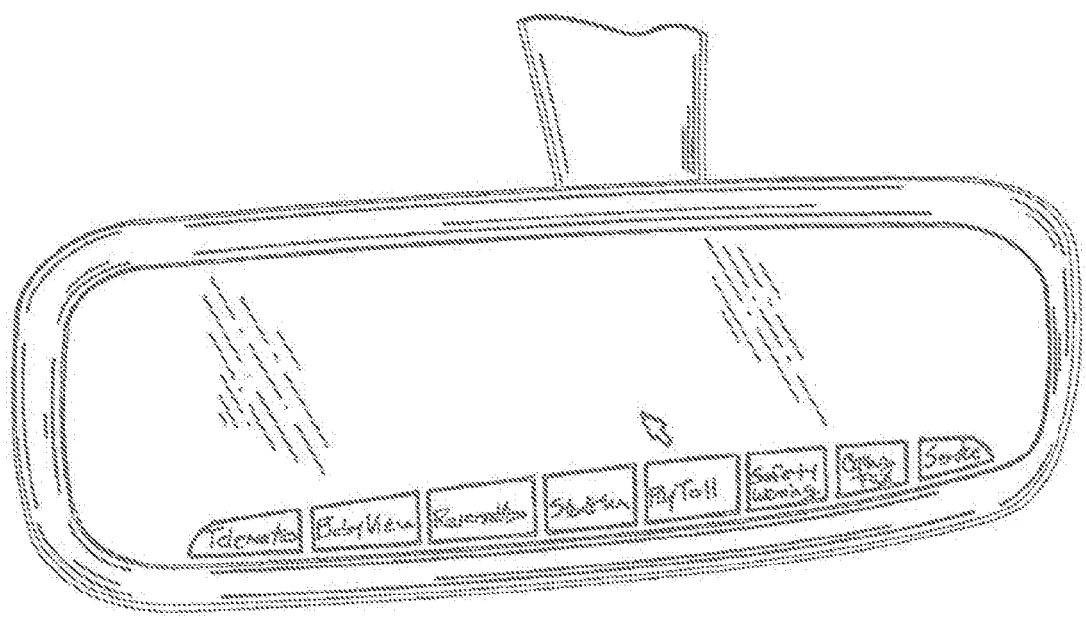
FIG. 21 is a similar view to FIGS. 15, 16, 17 and 18 illustrating another selection of one of the selector elements.
Figure 22:
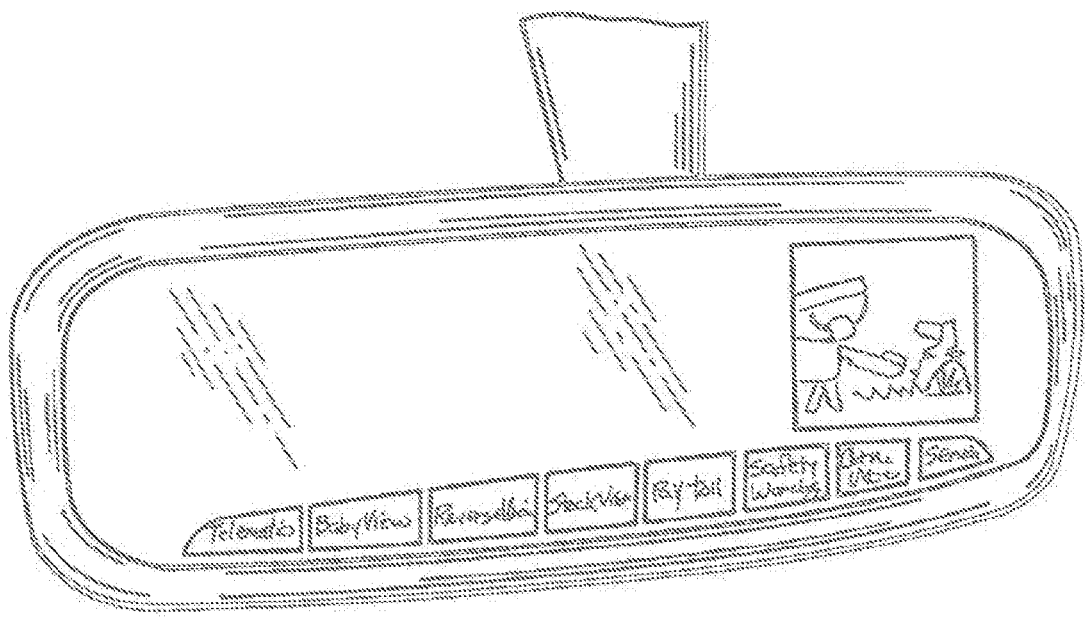
FIG. 22 is a similar view to FIGS. 17 and 18, with the video screen displaying reverse aid images.

A safety warning or message (such as a tire pressure warning or a seat belt warning or an airbag deactivation warning or an engine or vehicle system malfunction warning or the like), can be provided at the touch sensitive surface 726 to alert the driver, as illustrated in FIG. 21. Optionally, the driver can touch the selector element at or adjacent to where the warning is displayed to bring up a menu of other choices/inputs in response to the cause of the warning. The vehicle can be provided with a rear facing camera for use when reversing (or a front facing camera for use in parking, rain sensing, or head lamp control or the like), such as is disclosed in U.S. Pat. Nos. 5,959,367; 5,929,786; 5,949,331; 5,914,815; 5,786,772; 5,798,575; 5,670,935; and U.S. patent application Ser. No. 09/304,201, filed May 3, 1999; Ser. No. 09/375,315, filed Aug. 16, 1999; Ser. No. 09/199,907, filed Nov. 25, 1998; Ser. No. 09/361,814, filed Jul. 27, 1999; Ser. No. 09/372,915, filed Aug. 12, 1999; Ser. No. 09/300,201, filed May 3, 1999; and Ser. No. 09/313,139, filed May 17, 1999, which are all commonly assigned to Donnelly Corporation of Holland, Mich. By the driver touching reflective element 712 at the portion of touch sensitive element 726 indicating "REVERSE AID," an image immediately to the rear of the vehicle, as illustrated in FIG. 22, is displayed by display element 728.

Touch sensitive element 726 can be a capacitive type or a resistive type or an inductive type, such as are known in the touch panel arts, including such as disclosed in U.S. Pat. Nos. 3,798,370; 4,198,539; 4,661,655; 4,731,508; 4,822,957; 5,045,644; 6,001,486; and 6,087,012, and U.S. Pat. applications, Ser. No. 60/213,663, filed Jun. 23, 2000; Ser. No. 60/231,096, filed Sep. 8, 2000; Ser. No. 60/239,788, filed Oct. 12, 2000; Ser. No. 60/234,867, filed Sep. 22, 2000; Ser. No. 60/244,577, filed Oct. 31, 2000. Also, the touch inputs of this present invention do not necessarily require physical contact between the driver's finger and touch sensitive element 726. Close approach of the driver's finger (or a stylus) to the touch sensitive surface may suffice to achieve a touch input. This can thus be by non-contacting input or by contacting input by a variety of means such as thermal or pyro detection, capacitive or inductive detection, resistive sensing, electromagnetic disturbance sensing or the like. Optionally, a reading of the fingerprint of the person touching the mirror reflector can be taken to verify identity of the person and so authorize particular actions in response (such as turning on the vehicle ignition, such as to star the engine, conducting a remote banking transaction, identifying a person for the purpose of setting vehicle accessories such as seat position, mirror position, climate control, audio system controls, ride system, and the like to the particular setting preferred by that individual person such as is common in vehicle memory systems).

Touch sensitive element 726 can comprise a transparent conductive coating or stack of coatings, such as of indium tin oxide, tin oxide, doped tin oxide, doped zinc oxide, or any other transparent conductor coating or stack known in the touch screen arts, and can be part of a 4-wire system or a 5-wire system as such are known in the touch screen art, or can be a capacitive-type touch screen.

Preferably, touch screen element 726 and display element 728 are re-configurable so that each can be associated with more than one function. Dependent on the particular circumstance, an in-vehicle microprocessor can create on touch screen element 726 and display element 728 whatever icon, highlight or display is desired presented to the driver. In addition, one of the touch screen elements (726) may be used to toggle between the various available functions for a given touch screen element 726.

Note that the display that the driver touches via touch screen element 726 can be generated by display element 728 itself or alternately, by a separate display located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium, (or their alloys), or the like, or a dichroic coating or coating stack, can be used that substantially masks the display element from driver notice until the display element is powered to display information, such as disclosed in U.S. Pat. Nos. 5,668,663 and 5,724,187. Such has been described as "display on demand" in the art. Such display can include a "display on demand" such as disclosed in U.S. Pat. Nos. 5,668,663 and 5,724,187 noted above. In this regard, it is preferable that the display be a light emitting display, such as a fluorescent display, a vacuum fluorescent display, a field emission display, an electroluminescent display, a fluorescent display, a plasma display, or a light emitting diode display, such as an organic or inorganic light emitting diode display. Alternatively, the reflective element may comprise a substantially reflecting, significantly light transmitting reflective element, such as disclosed in U.S. Pat. Nos. 5,668,663 and 5,724,187 noted above. An example, such as a semitransparent reflector would be a third surface reflector coated on the third surface of an electrochromic mirror element, as known in the electrochromic mirror art, consisting of a thin metal coating (such as of silver, silver alloy, aluminum, aluminum alloy) that is significantly reflecting but also significantly transmitting and that, preferably, is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/significantly transflective reflective element, reference is made to U.S. Pat. Nos. 5,668,663 and 5,724,187.

A preferred construction for the interactive mirror reflective element of the present invention is shown in FIG. 22. Interactive mirror assembly 740 comprises a touch screen 744 upon which, on its outermost surface, is comprised a touch sensitive element, such as a touch sensitive element comprising a transparent electronic conducting coating of indium tin oxide. Behind touch screen 744 is disposed reflective element 742. Between the touch screen 744 and the reflective element 742 is disposed display element 748. Display element 748 is preferably a liquid crystal, an electrochromic, a plasma, or an electroluminescent element that has high transparency in one state and that either emits light or absorbs light it a second state. Individual pixels of display element 748 are, preferably, addressable so that display element 748 is reconfigurable. When in its high transparency state, display element 748 allows light incident thereon from touch screen 744 pass through and reflect off the mirror reflective coating of reflective element 742 (which may be a silvered prism element or may be an electrochromic element). When particular pixels of display element 748 are activated, the display formed thereby is visible in front of reflective element 712.

Co-location of the touch sensitive element (in a superimposed relationship or in a proximate relationship) and the display element it controls in accordance with the present invention has several advantages. For example, and as noted above there is a cognitive relationship established between the touching of the touch sensitive element and the generation of the display image. With the display element positioned behind at least a partially transparent touch sensitive element, such that activation of the touch sensitive element causes the display element to emit an image at least partially visible and preferably at least substantially visible through the transparent touch sensitive element, there is a cognitive association between the touch sensitive element and the display, thus reducing the amount of distraction to the driver. Also, the driver can repetitively touch a particular touch sensitive element and scroll down through a menu of options seen to be displayed by the particular display element associated with that particular touch sensitive element. Upon reaching a menu item desired selected, that menu item may be selected by the driver (such as by touching "OK" on a separate touch sensitive element). After using the interactive system for a while, a driver can select a selector element without looking directly at the mirror, with the image generated by the display element being only detected in the peripheral vision of the driver. Furthermore, by co-locating the display element behind the touch sensitive element, the viewing area of the reflective element is maximized.

As an alternate and/or an addition to providing a touch sensitive surface/element accessible by touching the mirror reflective element, a touch sensitive surface/element can optionally be provided in the bezel of the casing of the interior mirror assembly, such as in a chin portion below the reflective element of the assembly or in an eyebrow region above the reflective element or at a mirror mount or support region or an accessory module or pod attached or adhered or adjacent to the interior mirror assembly.

The rearview mirror assemblies of the present invention can incorporate a wide variety of electrical and electronic devices incorporated therein and further utility functions, such as described in U.S. Pat. application entitled REARVIEW MIRROR ASSEMBLY WITH UTILITY FUNCTIONS, filed Nov. 24, 1999, by Barry W. Hutzel, Niall R. Lynam, and Darryl P. DeWind, and added display features as described in U.S. Pat. application entitled REARVIEW MIRROR ASSEMBLY WITH ADDED FEATURE MODULAR DISPLAY, filed Nov. 24, 1999, by Timothy Skiver et al. For example, the rearview mirror assemblies of the present invention may include: antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser. No. 09/244,726, filed Feb. 5, 1999; blind spot detection systems, such as disclosed in U.S. Pat. Nos. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467; a remote keyless entry receiver; map lights, such as disclosed in U.S. Pat. Nos. 5,938,321; 5,813,745; 5,820,245; 5,673,994; 5,649,756; or 5,178,448, including a non-incandescent light, such as an LED source unit, preferably a white light emitting LED, including a non-incandescent light source unit, such as described in co-pending U.S. provisional application Ser. No. 60/271,466, filed Feb. 26, 2001; microphones and/or speakers, such as disclosed in U.S. patent application Ser. No. 09/361,814, filed Jul. 27, 1999, and Ser. No. 09/199,907, filed Nov. 25, 1998; a compass, such as disclosed in U.S. Pat. No. 5,924,212; seat occupancy detector; a trip computer; an ONSTAR® System or the like, with all of the referenced patents and applications being commonly assigned to Donnelly Corporation.

In addition, the touch system of the present invention may encompass a global positioning system (GPS), such as described in U.S. application entitled COMPLETE MIRROR-BASED GLOBAL POSITIONING SYSTEM (GPS) NAVIGATION SOLUTION, filed by Kevin C. McCarthy, Eugene V. Uhlmann, and Niall R. Lynam, on Mar. 3, 2001.

Mirror system 710 may include circuitry for mirror mounted video cameras, which are used to visually detect the presence of moisture on the windshield and actuate windshield wipers accordingly, and/or actuate or control vehicle headlights, such as described in U.S. patent application Ser. No. 08/621,863, filed Mar. 25, 1996, now U.S. Pat. No. 6,097,023, Ser. No. 09/599,979, filed Jun. 22, 2000, or Ser. No. 09/441,341, filed Nov. 16, 1999, or mirror mounted cameras for vehicle internal cabin monitoring disclosed in U.S. Pat. Nos. 5,877,897; 5,550,677; and 5,760,962, both commonly assigned to Donnelly Corporation, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent application Ser. No. 09/375,315, filed Aug. 16, 1999; Ser. No. 09/304,201, filed May 3, 1999; Ser. No. 09/313,139, filed May 17, 1999; Ser. No. 09/776,625, filed Feb. 5, 2001, now U.S. Pat. No. 6,611,202; Ser. No. 09/304,201, filed May 3, 1999; Ser. No. 09/375,315, filed Aug. 16, 1999; Ser. No. 09/199,907, filed Nov. 25, 1998; Ser. No. 09/361,814, filed Jul. 27, 1999; Ser. No. 09/372,915, filed Aug. 12, 1999; Ser. No. 09/300,201, filed May 3, 1999; and Ser. No. 09/313,139, filed May 17, 1999, which are all commonly assigned to Donnelly Corporation of Holland, Mich. Examples of a tire pressure display or monitoring system is described in U.S. patent application Ser. No. 09/513,941, filed Feb. 28, 2000, now U.S. Pat. No. 6,294,989, and TIRE INFLATION ASSISTANCE MONITORING SYSTEM, filed Nov. 10, 2000, now U.S. Pat. No. 6,445,287.

In addition, lighting provided in any of the rearview mirror assemblies may incorporate a non-incandescent light source unit, such as described in U.S. provisional application Ser. No. 60/271,466, filed Feb. 26, 2001.

Other features which can be incorporated include: a baby minder system, such as the vehicle interior monitoring system described in U.S. Pat. Nos. 5,877,897 and 5,760,962 or the rear vision system described in pending U.S. patent application Ser. No. 09/361,814, filed Jul. 27, 1999, and Ser. No. 09/199,907, filed Nov. 25, 1998, and Ser. No. 09/422,467, filed Nov. 4, 1999.

In addition, all of the above interactive automotive rear vision systems may be part of a video display assembly, such as disclosed in application Ser. No. 09/793,002, filed Feb. 26, 2001, now U.S. Pat. No. 6,690,268.

Therefore, it can be appreciated that an interactive mirror system is provided that enables a driver to interact with multiple systems or devices and also provides the driver with a multitude of information, with these various features centrally located at the interior rearview mirror assembly.

Therefore, the present invention provides a human machine interface with at least one user actuatable input at the bezel portion and/or casing of the mirror assembly. The user actuatable inputs may be integrally formed or molded with the bezel portion or may be insert molded in the bezel during the molding of the bezel portion of the mirror assembly, and may be actuatable to control or adjust or toggle or modulate or activate/deactivate an accessory or system or display or the like that is at or in or associated with the mirror assembly. The actuator is integrally formed with the bezel so that a separate keypad or other buttons need not be assembled or positioned at the bezel during the assembly of the mirror assembly. The bezel (with the integrally formed or molded or insert molded toggle or button or actuator or the like) may be attached to a reflective element and/or printed circuit board and/or mirror casing, such that the actuator is positioned at or aligned with a corresponding PCB-mounted element or switch at the printed circuit board within the mirror assembly. The present invention thus provides enhanced manufacturing and assembly of an interior rearview mirror assembly. Optionally, the user input may be positioned partially within the casing and may pivot and/or flex to contact and actuate the element or switch or switches at the printed circuit board. The user input thus may comprise a low cost plastic or polymeric lever or member that may be readily positioned within the casing during assembly of the rearview mirror assembly.

Changes and modifications in the specifically described embodiments may be carried out without departing from the principles of the present invention, which is intended to be limited only by the scope of the appended claims, as interpreted according to the principles of patent law.

What is claimed is:

1. An interior rearview mirror system suitable for use in a vehicle, said interior rearview mirror system comprising:

an interior rearview mirror assembly comprising a mirror casing and a transflective reflective element;

wherein said transflective reflective element comprises a front transparent substrate and a rear transparent substrate;

wherein said front transparent substrate is spaced apart from and is joined to said rear transparent substrate by a seal;

wherein an electrochromic medium is disposed in a cavity established by said seal between said front transparent substrate and said rear transparent substrate;

wherein said transflective reflective element comprises a transflective mirror reflector disposed at a surface of said rear transparent substrate;

wherein said electrochromic medium of said transflective reflective element establishes an electrochromic active region and wherein said electrochromic medium is operable to electrically vary the reflectivity of said transflective reflective element at said electrochromic active region by applying a voltage thereto;

a plurality of user input elements disposed outside of said electrochromic active region;

wherein, when said interior rearview mirror assembly is normally mounted in a vehicle equipped with said interior rearview mirror system, said plurality of user input elements is disposed below said electrochromic active region;

wherein, when said interior rearview mirror assembly is normally mounted in the equipped vehicle, individual user input elements of said plurality of user input elements are arranged generally linearly and horizontally one to another;

wherein each of said individual user input elements comprises at least one of (i) a touch sensor and (ii) a proximity sensor;

wherein said user input elements are illuminated by backlighting;

wherein at least one of said individual user input elements comprises a user input element for at least one of (a) a telematics system of the equipped vehicle, (b) an HVAC system of the equipped vehicle, (c) a compass system of the equipped vehicle, (d) a navigation system of the equipped vehicle, (e) an imaging system of the equipped vehicle, (f) a communication system of the equipped vehicle, (g) an accessory system of the equipped vehicle and (h) an audio system of the equipped vehicle;

a plurality of display elements disposed behind said transflective mirror reflector of said transflective reflective element at said electrochromic active region;

wherein, when said interior rearview mirror assembly is normally mounted in the equipped vehicle, individual display elements of said plurality of display elements are arranged generally linearly and horizontally one to another;

wherein each individual display element of said plurality of display elements is associated with a respective one of said user input elements;

wherein a display element is selectively activated by activation of its respective user input element, and wherein each of said plurality of display elements, when activated, displays through said transflective mirror reflector of said transflective reflective element and through said electrochromic medium of said electrochromic active region;

wherein each of said individual display elements and its associated respective one of said individual user input elements are located local to one another such that a cognitive relationship between actuation by a user of a respective user input element and activation of its associated display element is established; and wherein circuitry is disposed in said mirror casing, and wherein at least one of said user input elements is operable to provide a user input to at least one element of said circuitry, and wherein said circuitry is associated with a display device disposed behind said transflective mirror reflector of said interior rearview mirror assembly and visible through said transflective mirror reflector to the driver when displaying information, and wherein said display device comprises a video screen.

2. The interior rearview mirror system of claim 1, wherein said circuitry comprises, at least in part, a part of a humidity control system of the equipped vehicle, and wherein a sensor is operable to sense a condition at the in-cabin surface of the windshield of the equipped vehicle, and wherein, responsive to said sensing by said sensor, an HVAC system of the equipped vehicle is activated.

3. The interior rearview mirror system of claim 1, wherein said mirror casing comprises a bezel formed of a molded plastic material in a molding operation, and wherein a plurality of actuatable elements are arranged along a portion of said bezel, and wherein said actuatable elements are integrally formed at said portion of said bezel during said molding operation that forms said bezel, said actuatable elements each comprising a molded plastic material body portion and a molded plastic material flexible portion, said molded plastic material flexible portion connecting said molded plastic material body portion to the remainder of said bezel so that said body portion is movable relative to the remainder of said bezel via flexing of said flexible portion when said actuatable element is actuated by a user pressing said body portion, and wherein circuitry is disposed within said casing and has electrical actuation switches located generally proximate to and rearward of said body portions of said actuatable elements.

4. The interior rearview mirror system of claim 1, wherein said user input elements are backlit by respective light emitting diodes.

5. The interior rearview mirror system of claim 4, wherein etched portions of said mirror reflector is backlit by respective light emitting diodes.

6. The interior rearview mirror system of claim 1, wherein at least some of said individual user input elements comprise an enhancement to enhance a user's awareness of the presence or function of said individual user input elements, and wherein said enhancement comprises at least one of (i) a backlit etched character formed in a reflective layer of said mirror reflector, (ii) a backlit etched icon formed in a reflective layer of said mirror reflector, (iii) a backlit etched logo formed in a reflective layer of said mirror reflector and (iv) a backlit etched letter formed in a reflective layer of said mirror reflector.

7. The interior rearview mirror system of claim 1, wherein said individual user input elements comprise at least one of capacitive touch sensors, resistive touch sensors and inductive touch sensors.

8. An interior rearview mirror system suitable for use in a vehicle, said interior rearview mirror system comprising:

an interior rearview mirror assembly comprising a mirror casing and a transflective reflective element;

wherein said transflective reflective element comprises a transparent substrate with a transflective mirror reflector disposed at a surface of said transparent substrate;

a plurality of user input elements disposed at a perimeter region of said transflective reflective element;

wherein, when said interior rearview mirror assembly is normally mounted in a vehicle equipped with said interior rearview mirror system, said plurality of user input elements is disposed along a lower perimeter region of said transflective reflective element;

wherein, when said interior rearview mirror assembly is normally mounted in the equipped vehicle, individual user input elements of said plurality of user input elements are arranged generally linearly and horizontally one to another;

wherein each of said individual user input elements comprises a touch sensor;

wherein said user input elements are illuminated by backlighting;

a plurality of display elements disposed behind said transflective mirror reflector of said transflective reflective element;

wherein, when said interior rearview mirror assembly is normally mounted in the equipped vehicle, individual display elements of said plurality of display elements are arranged generally linearly and horizontally one to another;

wherein each individual display element of said plurality of display elements is associated with a respective one of said user input elements;

wherein a display element is selectively activated by activation of its respective user input element, and wherein each of said plurality of display elements, when activated, displays through said transflective mirror reflector of said transflective reflective element; and wherein each of said individual display elements and its associated respective one of said individual user input elements are located local to one another such that a cognitive relationship between actuation by a user of a respective user input element and activation of its associated display element is established.

9. The interior rearview mirror system of claim 8, wherein at least one of said individual user input elements comprises a user input element for at least one of (a) a telematics system of the equipped vehicle, (b) an HVAC system of the equipped vehicle, (c) a compass system of the equipped vehicle, (d) a navigation system of the equipped vehicle, (e) an imaging system of the equipped vehicle, (f) a communication system of the equipped vehicle, (g) an accessory system of the equipped vehicle and (h) an audio system of the equipped vehicle.

10. The interior rearview mirror system of claim 8, wherein circuitry is disposed in said mirror casing, and wherein at least one of said user input elements is operable to provide a user input to at least one element of said circuitry, and wherein said circuitry is associated with a display device disposed behind said transflective mirror reflector of said interior rearview mirror assembly and visible through said transflective mirror reflector to the driver when displaying information, and wherein said display device comprises a video screen.

11. The interior rearview mirror system of claim 8, wherein said individual display elements are disposed behind an etched portion of said mirror reflector and wherein, when activated, said individual display elements display through said etched portion of said mirror reflector of said reflective element.

12. The interior rearview mirror system of claim 8, wherein said touch sensors comprise an enhancement to enhance a user's awareness of the function of said touch sensors, and wherein said enhancement comprises at least one of (i) an etched character formed in a reflective layer of said mirror reflector, (ii) an etched icon formed in a reflective layer of said mirror reflector, (iii) an etched logo formed in a reflective layer of said mirror reflector and (iv) an etched letter formed in a reflective layer of said mirror reflector.

13. The interior rearview mirror system of claim 8, wherein said touch sensors comprise an enhancement to enhance a user's awareness of the function of said touch sensors, and wherein said enhancement comprises at least one of text, an icon, a character, a logo and a letter established at said at least some of said individual user input elements.

14. The interior rearview mirror system of claim 8, wherein said touch sensors comprise an enhancement to enhance a user's awareness of the function of said touch sensors, and wherein said enhancement comprises at least one of a color, a shape and a texture of said at least some of said individual user input elements.

15. The interior rearview mirror system of claim 8, wherein said at least some of said individual user input elements are backlit by a respective light emitting diode.

16. The interior rearview mirror system of claim 15, comprising an etched portion of said mirror reflector at respective user input elements and wherein said etched portion is backlit by the respective light emitting diode.

17. The interior rearview mirror system of claim 8, wherein said touch sensors comprise at least one of capacitive touch sensors, resistive touch sensors and inductive touch sensors.

18. An interior rearview mirror system suitable for use in a vehicle, said interior rearview mirror system comprising:

an interior rearview mirror assembly comprising a mirror casing and a transflective reflective element;

wherein said transflective reflective element comprises a transparent substrate with a transflective mirror reflector disposed at a surface of said transparent substrate;

a plurality of user input elements disposed at a perimeter region of said transflective reflective element;

wherein, when said interior rearview mirror assembly is normally mounted in a vehicle equipped with said interior rearview mirror system, said plurality of user input elements is disposed along a lower perimeter region of said transflective reflective element;

wherein, when said interior rearview mirror assembly is normally mounted in the equipped vehicle, individual user input elements of said plurality of user input elements are arranged generally linearly and horizontally one to another;

wherein each of said individual user input elements comprises a touch sensor;

wherein said user input elements are backlit by respective light emitting diodes;

a plurality of display elements disposed behind said transflective mirror reflector of said transflective reflective element;

wherein, when said interior rearview mirror assembly is normally mounted in the equipped vehicle, individual display elements of said plurality of display elements are arranged generally linearly and horizontally one to another;

wherein each individual display element of said plurality of display elements is associated with a respective one of said user input elements;

wherein a display element is selectively activated by activation of its respective user input element, and wherein each of said plurality of display elements, when activated, displays through said transflective mirror reflector of said transflective reflective element;

wherein each of said individual display elements and its associated respective one of said individual user input elements are located local to one another such that a cognitive relationship between actuation by a user of a respective user input element and activation of its associated display element is established;

wherein said user input elements comprise an enhancement to enhance a user's awareness of the function of said user input elements, and wherein said enhancement comprises at least one of text, an icon, a character, a logo and a letter established at said at least some of said individual user input elements; and wherein said enhancement for each respective user input element is backlit by the respective light emitting diode.

19. The interior rearview mirror system of claim 18, wherein said enhancement comprises at least one of (i) an etched character formed in a reflective layer of said mirror reflector, (ii) an etched icon formed in a reflective layer of said mirror reflector, (iii) an etched logo formed in a reflective layer of said mirror reflector and (iv) an etched letter formed in a reflective layer of said mirror reflector.

20. The interior rearview mirror system of claim 18, wherein said touch sensors comprise at least one of capacitive touch sensors, resistive touch sensors and inductive touch sensors.

\* \* \* \* \*